United States Patent
Ohno

(10) Patent No.: US 8,964,316 B2
(45) Date of Patent: Feb. 24, 2015

(54) LENS DRIVER

(71) Applicant: Takehide Ohno, Yokohama (JP)

(72) Inventor: Takehide Ohno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 61 days.

(21) Appl. No.: 13/905,701

(22) Filed: May 30, 2013

(65) Prior Publication Data

US 2013/0321938 A1 Dec. 5, 2013

(30) Foreign Application Priority Data

Jun. 1, 2012 (JP) ................. 2012-125765

(51) Int. Cl.
*G02B 7/02* (2006.01)
*G02B 7/09* (2006.01)
(52) U.S. Cl.
CPC ....................... *G02B 7/09* (2013.01)
USPC .......................... 359/824; 359/823
(58) Field of Classification Search
CPC ........................................................ G02B 7/09
USPC ................................................. 359/822–824
See application file for complete search history.

(56) References Cited

U.S. PATENT DOCUMENTS

| | | | | |
|---|---|---|---|---|
| 5,572,372 | A | * | 11/1996 | Sekine et al. ................ 359/824 |
| 2007/0154195 | A1 | | 7/2007 | Irisawa et al. |
| 2009/0086040 | A1 | | 4/2009 | Ohno |
| 2009/0189987 | A1 | | 7/2009 | Muramatsu et al. |
| 2009/0208196 | A1 | | 8/2009 | Ohno et al. |
| 2010/0013939 | A1 | | 1/2010 | Ohno et al. |
| 2010/0178044 | A1 | | 7/2010 | Ohno |
| 2011/0188841 | A1 | | 8/2011 | Ohno |
| 2012/0038784 | A1 | | 2/2012 | Irisawa et al. |
| 2012/0063014 | A1 | | 3/2012 | Terahara et al. |
| 2013/0063832 | A1 | | 3/2013 | Ohno et al. |

FOREIGN PATENT DOCUMENTS

JP 2006-58512 3/2006

* cited by examiner

*Primary Examiner* — William Choi
(74) *Attorney, Agent, or Firm* — Oblon, Spivak, McClelland, Maier & Neustadt, L.L.P.

(57) ABSTRACT

A lens driver which moves at least one lens relative to a supporter includes a holder provided in the supporter to hold the lens to be movable in an optical axis direction, a driver configured to apply to the holder a driving force in the optical axis direction, and a position detector configured to detect a position of the holder in the optical axis direction relative to the supporter, and the lens driver including a coil provided in one of the holder and the supporter to form a straight electric path orthogonal to the optical axis direction, and a magnetic circuit provided in the other of the holder and the supporter, the magnetic circuit including a rectangular magnetic pole surface having a predetermined width to form a magnetic field orthogonal to the optical axis direction and the electric path, and being provided such that the magnetic pole surface faces the optical path.

10 Claims, 10 Drawing Sheets

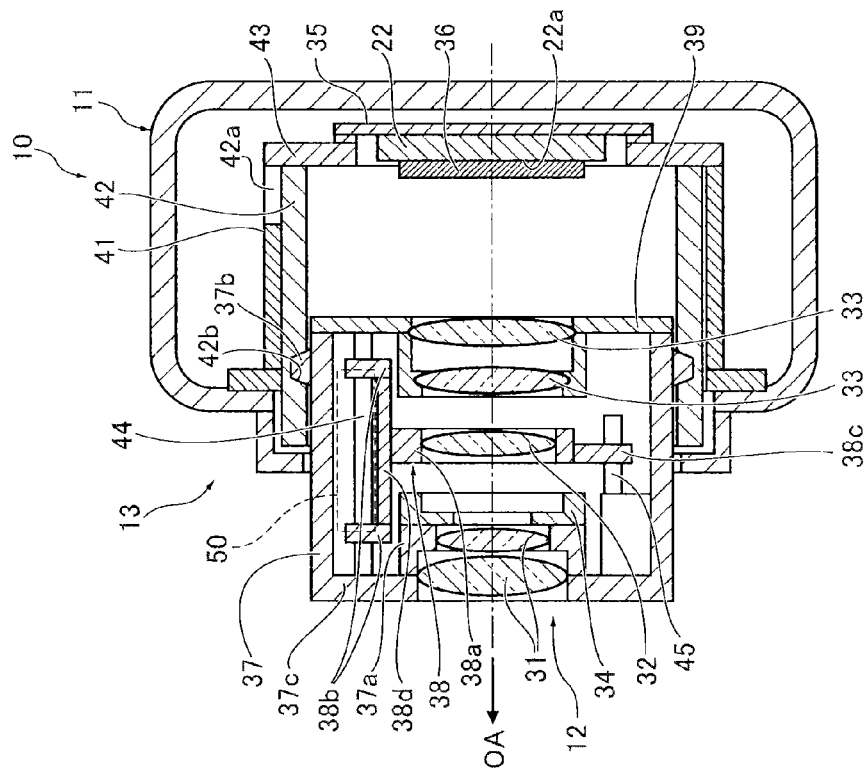
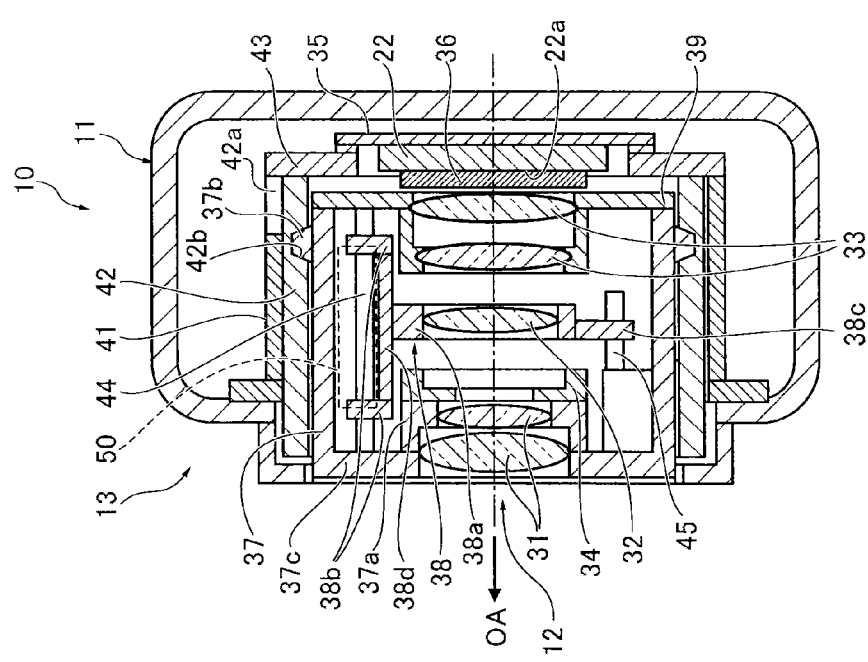

LENS DRIVER

PRIORITY CLAIM

The present application is based on and claims priority from Japanese Patent Application No. 2012-125765, filed on Jun. 1, 2012, the disclosure of which is hereby incorporated by reference in its entirety.

BACKGROUND

1. Field of the Invention

The present invention relates to a lens driver which moves a lens holder in an optical axis direction relative to a supporter.

2. Description of the Related Art

A lens driver, which moves a holder for a zooming lens and a focusing lens in an optical axis direction relative to a supporter movably supporting the holder, is used in an imaging device such as a video camera or a digital still camera having an autofocus function and power zoom function. The lens driver is provided with a driver which moves the holder relative to the supporter and a position detector which detects the position of the moved holder (lens held in holder).

Regarding the position detector, it is considered to provide in the holder a position-detecting magnet, which is magnetized in the optical axis direction, and a magnetism-detecting element (magnetic sensor) in a position in the supporter, which faces the position-detecting magnet in the optical axis direction (for example, refer to Patent Document 1, JP 4247622B). In this position detector, upon the movement of the holder in the optical direction relative to the supporter, the interval between the position-detecting magnet and the magnetism-detecting element is changed according to the position, so that the intensity of the magnetic field formed by the position-detecting magnet is changed according to the interval in the magnetism-detecting element. Therefore, an unambiguous relationship between the output voltage value from the magnetism-detecting element and the positional relationship of the supporter and the holder can be obtained. For this reason, in the position detector, the position of the holder can be detected based on the output voltage value of the magnetism-detecting element regardless of the position of the holder relative to the supporter, thus, the position of the holder can be immediately detected.

However, in the above-described position detector (lens driver), if a distance from the position-detecting magnet exceeds a predetermined length, intensity of a magnetic field formed by the position-detecting magnet hardly changes relative to a change in a position, so that the moving range of the holder relative to the supporter is limited. In this case, in the above-described position detector (lens driver), it is considered to provide two magnetism-detecting elements to sandwich the position-detecting magnet in the optical axis direction. However, such a configuration is only to double the moving range compared to a configuration having a single magnetism-detecting element, and the moving range of the holder relative to the supporter is also limited. In addition, in the above-described position detector (lens driver), it is necessary to provide a position-detecting magnet dedicated for detecting a position of a holder.

SUMMARY

The present invention has been made in view of the above circumstances and an object of the present invention to provide a lens driver which can detect a position of a holder over a wide moving range.

To attain the above object, one embodiment of the present invention provides a lens driver which moves at least one lens in an optical axis direction relative to a supporter, including: a holder provided in the supporter to hold the lens to be movable in the optical axis direction; a driver configured to apply to the holder a driving force in the optical axis direction relative to the supporter; and a position detector configured to detect a position of the holder in the optical axis direction relative to the supporter, the lens driver including: a coil provided in one of the holder and the supporter to form a straight electric path orthogonal to the optical axis direction; and a magnetic circuit provided in the other of the holder and the supporter, the magnetic circuit including a rectangular magnetic pole surface having a predetermined width to form a magnetic field orthogonal to the optical axis direction and the electric path, and being provided such that the magnetic pole surface facing the optical path, wherein the magnetic circuit is provided such that the magnetic pole surface is parallel to a plane including the optical axis direction and the straight line direction of the electric path, and a pair of side end portions of the magnetic pole surface as seen in its width direction is inclined to the optical axis direction, the position detector includes a magnetism-detecting element provided in the one of the holder and the supporter, and the magnetism-detecting element is provided to face one of the side end portions of the magnetic pole surface as seen in the direction of the magnetic field formed by the magnetic circuit.

BRIEF DESCRIPTION OF THE DRAWINGS

The accompanying drawings are included to provide further understanding of the present disclosure, and are incorporated in and constitute a part of this specification. The drawings illustrate embodiments of the present disclosure and, together with the specification, serve to explain the principle of the present disclosure.

FIGS. 3A, 3B are sectional views illustrating an inside of a casing 11 for describing a configuration of an imaging unit 13 and a change in the imaging unit 13. FIG. 3A illustrates a housed position and FIG. 3B illustrates an extended position.

DESCRIPTION OF THE PREFERRED EMBODIMENTS

Hereinafter, embodiments of a lens driver, imaging unit and imaging device equipped with the lens driver will be described with reference to the drawings.

Embodiment 1

A lens driver 50 as one example of a lens driver according to embodiments of the present invention and an imaging device 10 of Embodiment 1 as one example of an imaging unit and an imaging device (electronic device) provided with the lens driver will be described with reference to FIGS. 1-11. At first, the schematic configuration of the imaging device 10 will be described with reference to FIGS. 1, 2.

Figure 1:
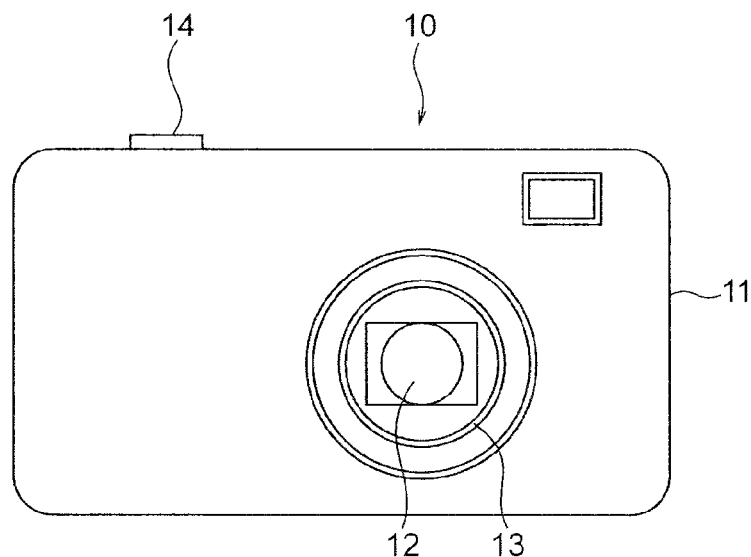
FIG. 1 is a view illustrating a device according to the present invention or an imaging device 10 as one example of an electronic device.

The imaging device 10 of Embodiment 1 is provided with an imaging unit 13 having a photographing optical system 12 on a front face thereof (front side surface as seen in FIG. 1 from the front) of a casing 11 forming an outer shape of a camera body. The photographing optical system 12 includes a plurality of optical members as will become apparent below (refer to FIG. 3). The imaging unit 13 is changeable between the housed state (predetermined collapsed position (refer to FIG. 3A)) and the photographing standby state (predetermined extended position (refer to FIG. 3B)) along the photographing optical axis (OA) of the photographing optical system 12. In this specification, the optical axis line in the photographing optical system 12, namely, the rotation symmetry axis which is the central axis position of each optical member is the photographing optical axis OA of the photographing optical system 12, namely, the imaging device 10.

A shutter button 14 as an operating portion is provided on the top surface (upper surface as seen in FIG. 1 from the front) of the casing 11. The shutter button 14 is pressed down when photographing a subject (pressing-down operation). The casing 11 is provided with a power button 15 (refer to FIG. 2) for an operation (start-up operation) which starts up the imaging device 10 and an operation (shut-off operation) which shuts off the imaging device 10. The back face of the casing 11 is provided with another operation switch 16 and the after-described display 24 (display surface) (refer to FIG. 2). The operation switch 16 includes various switches such as a direction-indicating switch for setting various scene modes, a still image mode, motion picture mode or the like or for setting each menu or the like. The display 24 displays an image based on imaged image data or image data recorded in a recording medium.

In the imaging device 10, the image data of a subject image received on a light-receiving surface 22a (refer to FIG. 3) of the after-described imaging element 22 through the photographing optical system 12 is recorded by the pressing-down operation of the shutter button 14. The imaging element 22 is arranged such that the light-receiving surface 22a is placed in the imaging position of the photographing optical system 12 (refer to FIG. 3B).

Figure 2:
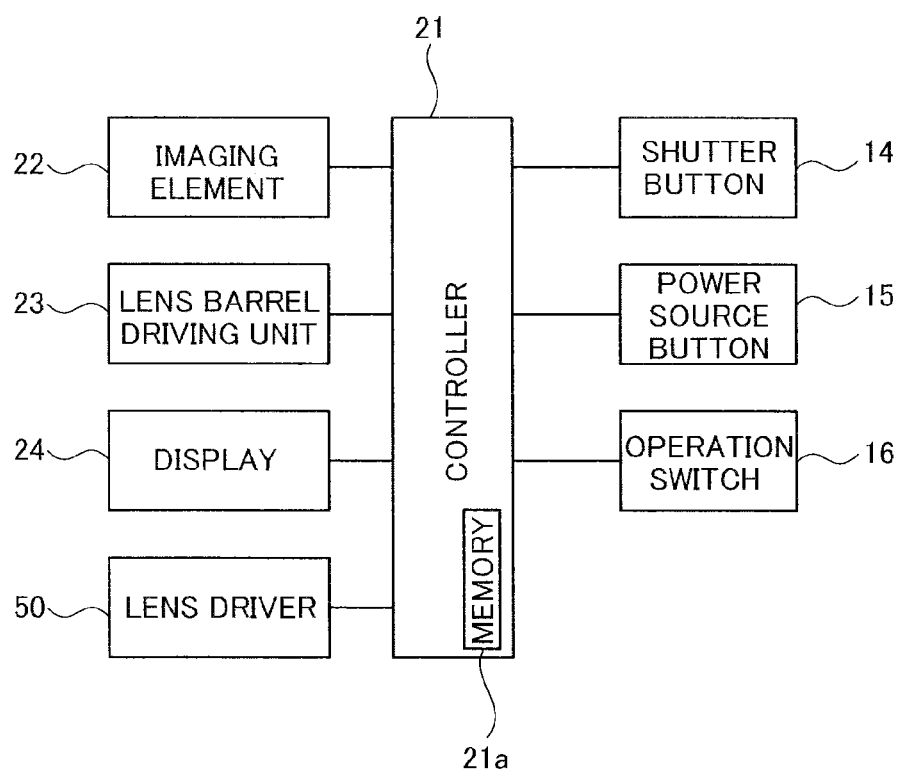
FIG. 2 is a block diagram illustrating a configuration of the imaging device 10.

As illustrated in FIG. 2, the imaging device 10 includes a controller 21, the above-described imaging element 22, a lens barrel-driving unit 23, the above-described display 24, and the lens driver 50. The imaging element 22 is an imaging element such as a CCD image sensor or a CMOS image sensor, and converts the subject image imaged on the light-receiving surface 22a (refer to FIG. 3) through the photographing optical system 12 into electric signals (image data) to be output. The output electric signals (image data) are transmitted to the controller 21. The lens barrel-driving unit 23 moves each optical member of the photographing optical system 12 through the lens barrel as will be described later. The lens driver 50 moves a second lens group 32 in the photographing optical axis OA direction as will be described later. The configuration of the lens driver 50 will be described afterward.

The controller 21 controls a driving process based on an operation made to the shutter button 14, power button 15 and operation switch 16 as operating sections, a generation process of image data based on the signals from the imaging element 22, the driving of the lens barrel-driving unit 23, display 24 and lens driver 50, or the like by a program. The controller 21 obtains an image by the imaging element 22 through the photographing optical system 12, and appropriately displays the image on the display 24 provided in the back face side of the casing 11. Power from a not-shown battery is supplied to the imaging element 22, lens barrel-driving unit 23, display 24 and lens driver 50 through the controller 21 to enable each operation.

Figure 4:
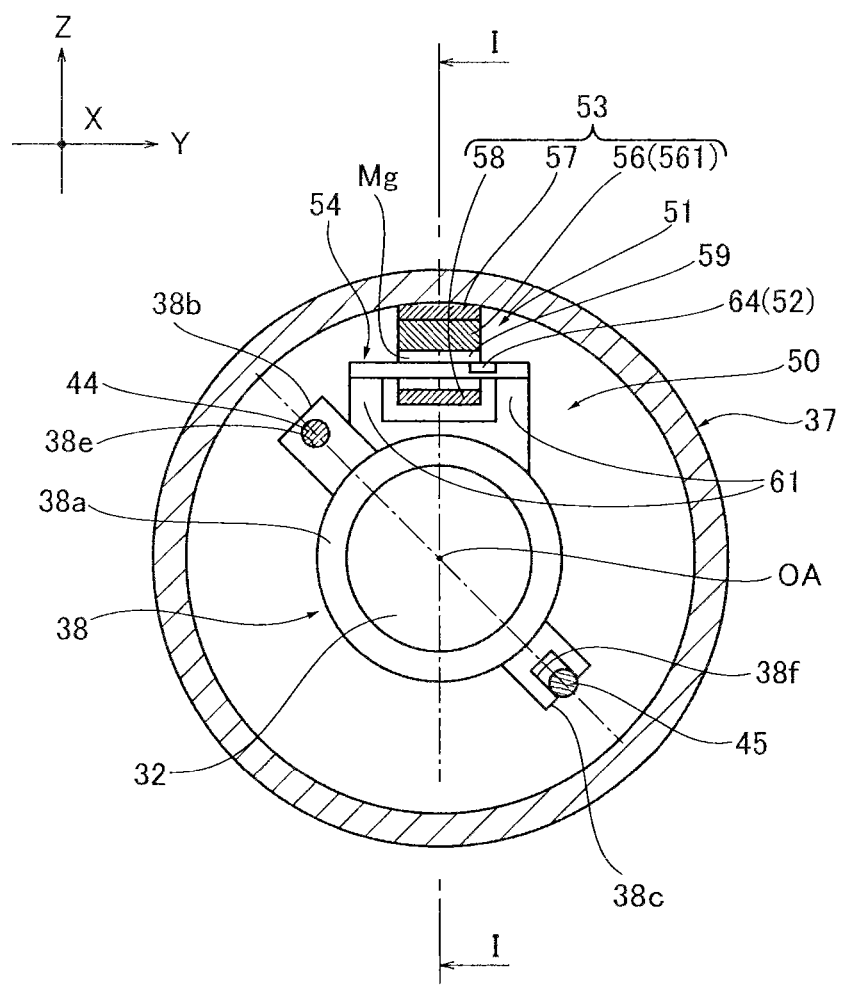
FIG. 4 is a sectional view, which is obtained along II-II line in FIG. 6, illustrating an inside of an outer frame 37 as seen from a subject side in a photographing optical axis OA direction for describing a configuration of a lens driver 50.
Figure 5:
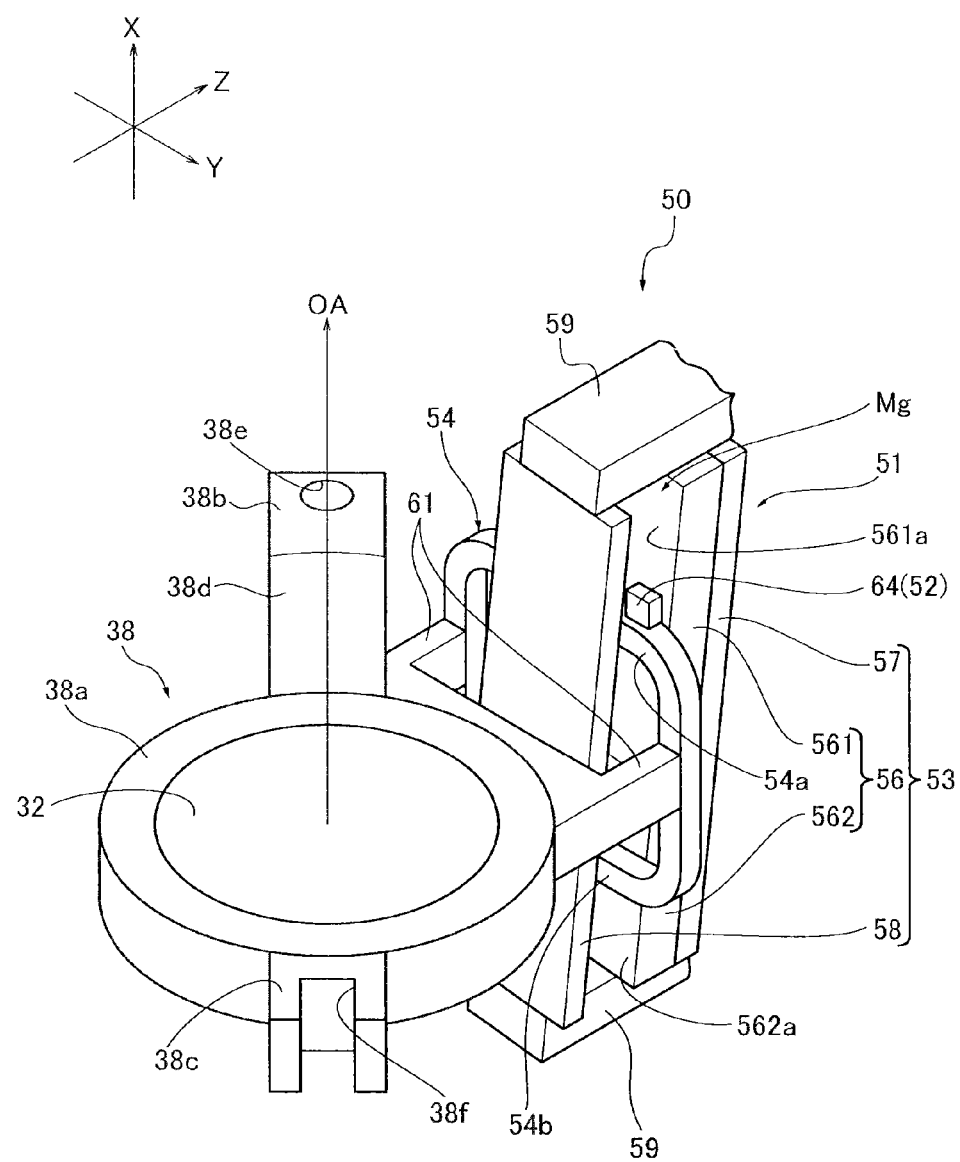
FIG. 5 is a perspective view illustrating a magnetic circuit 53 and a coil 54 in a lens driving mechanism 51 of the lens driver 50, and a magnetism-detecting element 64 in a position-detecting mechanism 52 of the lens driver 50.
Figure 6:
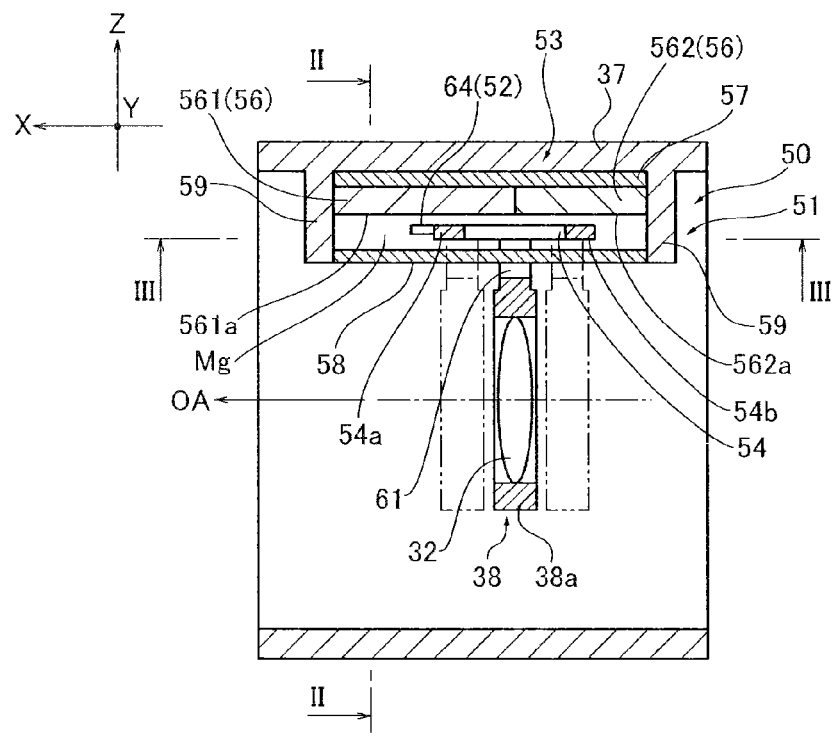
FIG. 6 is a sectional view, which is obtained along I-I line in FIG. 4, describing the configuration of the lens driver 50.

Next, the configuration of the imaging unit 13 will be described with reference to FIGS. 3A-5. FIGS. 3A, 3B are sectional views illustrating the inside of the casing 11 for describing the configuration of the imaging unit 13 and a change in the imaging unit 13. FIG. 3A illustrates a housed position and FIG. 3B illustrates an extended position. In FIGS. 3A, 3B, the lens driver 50 is illustrated by the dashed two-dot line for simplifying the description. FIG. 4 is a sectional view, which is obtained along II-II line in FIG. 6, illustrating the inside of the outer frame 37 as seen from a subject side in a photographing optical axis OA direction for describing the configuration of the lens driver 50. FIG. 5 is a perspective view illustrating a magnetic circuit 53 and a coil 54 in a lens-driving mechanism 51 (one example of driver) of the lens driver 50, and a magnetism-detecting element 64 in a position-detecting mechanism 52 (one example of position detector) of the lens driver 50.

As illustrated in FIGS. 3A, 3B, the imaging unit 13 includes a first lens group 31, second lens group 32, third lens group 33, shutter/aperture stop unit 34, imaging element 22, substrate 35, cover glass 36, outer frame 37, movable holding frame 38, lens-holding frame 39, fixed frame 41, rotation tube 42, base plate 43 and lens driver 50.

In the imaging unit 13, the first lens group 31, second lens group 32, and third lens group 33 are sequentially arranged from the object side, and the shutter/aperture stop unit 34 is arranged between the first lens group 31 and the second lens group 32 so as to constitute the photographing optical system 12.

The first lens group 31 includes one or more lenses. The first lens group 31 is fixed to the leading end portion (end portion on object side) of the outer frame 37 through a lens holding portion 37a which integrally holds the lens group 31. The lens holding portion 37a is fixed to the back face (face on image side) in the leading end portion of the outer frame 37.

The second lens group 32 includes one or more lenses. The second lens group 32 is integrally held by the movable holding frame 38, and is supported by the outer frame 37 through the movable holding frame 38, a main shaft 44 and a sub-shaft 45 to be movable in the photographing optical axis OA direction as will be described later. The second lens group 32 is used as a focusing lens as will be described later.

The third lens group 33 includes one or more lenses. This third lens group 33 is fixed to the back end (end portion on image surface side) portion of the outer frame 37 through a lens-holding frame 39 which integrally holds the third lens group 33. The lens-holding frame 39 is fixed to the back end portion of the outer frame 37.

The shutter/aperture stop unit 34 includes a shutter and an aperture stop. The shutter/aperture stop unit 34 is fixed to the back end (end portion on the image surface side) of the lens holding portion 37a provided in the leading end portion of the outer frame 37 for holding the first lens group 31.

The first to third lens groups 31-33 (including the shutter/aperture stop unit 34) operate as a plurality of optical members constituting the photographing optical system 12. The light-receiving surface 22a of the imaging element 22 is arranged in the imaging position (image surface side of the third lens group 33) of the photographing optical system 12 (first to third lens groups 31, 33 (including the shutter/aperture stop unit 34)). The imaging element 22 is mounted on the substrate 35, and the light-receiving surface 22a is covered by a cover glass 36. The substrate 35 is fixed to the base plate 43, and constitutes an electronic circuit on which the imaging element 22 and electronic components are appropriately mounted. The cover glass 36 is an optical filter, and is provided in the base plate 43. The base plate 43 is attached to the casing 11 through the fixed frame 41.

The fixed frame 41 has a box shape having both ends open, and is provided inside the casing 11. The front end portion (end portion on the subject side) of the fixed frame 41 is attached to the casing 11 (back face), and the base plate 43 is fixed to the hack end portion (end portion on the image surface side) of the fixed frame 41. The inside shape of the fixed frame 41 has a cylindrical hollow shape, and a guide groove is formed in the inner circumferential face of the fixed frame 41. The guide groove is provided along a surface orthogonal to the photographing optical axis OA, and has a circular shape. The rotation tube 42 is provided inside the fixed frame 41.

The rotation tube 42 has a tube shape which can be inserted inside the fixed frame 41. A gear portion 42a is formed in the outer circumferential surface of the base end portion of the rotation tube 42. The gear portion 42a is provided along a surface orthogonal to the photographing optical axis OA. The output gear of a not-shown driving motor of the lens barrel-driving unit 23 (refer to FIG. 2) engages with the gear portion 42a. A cam groove 42b is provided in the inner circumferential surface of the rotation tube 42. The after-described cam follower 37b of the outer frame 37 is inserted into the cam groove 42b to be relatively movable while having contact therewith. The cam groove 42b is provided to be inclined relative to the photographing optical axis OA direction, so as to convert the rotation force of the rotation tube 42 into the moving force in the photographing optical axis OA direction in the outer frame 37.

A not-shown guide projection is formed in the outer circumferential surface of the rotation tube 42. The guide projection is inserted into a not-shown guide groove provided in the inner circumferential surface of the fixed frame 41 to be relatively movable about the photographing optical axis OA (rotation direction having photographing the optical axis OA as the rotation axis line) while having contact therewith in the photographing optical axis OA direction. Therefore, the rotation tube 42 rotate about the photographing optical axis OA while being prevented from relatively moving in the photographing optical axis OA direction in the inside of the fixed frame 41. With this configuration, the rotation tube 42 rotate about the photographing optical axis OA while fixing its position in the photographing optical axis OA (photographing optical axis) relative to the base plate 43. The outer frame 37 is provided inside the rotation tube 42.

The outer frame 37 has a tubular shape that is insertable in the rotation tube 42, and is provided with the cam follower 37b projecting in the radial direction (orthogonal to the photographing optical axis OA and radiation direction) in the outer circumferential surface of the base end portion. The cam follower 37b is inserted in the cam groove 42b provided in the inner circumferential surface of the rotation tube 42 to be relatively movable while having contact therewith. The outer frame 37 is connected to the base plate 43 through a not-shown straight guide portion. The straight guide portion enable the outer frame 37 to move (straight movement) in the photographing optical axis OA direction relative to the base plate 43 (fixed frame 41), and prevents the outer frame 37 from rotating about the photographing optical axis relative to the base plate 43 (fixed frame 41). With this configuration, the outer frame 37 moves straight in the photographing optical axis OA direction relative to the base plate 43, namely, the fixed frame 41 fixed thereto to follow the cam locus of the cam groove 42b of the rotation tube 42 with which the cam follower 37b engages.

A flange 37c which reduces the inner diameter of the outer frame 37 is provided in the leading end (subject side) of the outer frame 37. The lens-holding frame 39, which integrally holds the third lens group 33, is fixed to the back end (end portion on image surface side) portion of the outer frame 37 as described above. The outer frame 37 is provided with the main shaft 44 bridged between the lens-holding frame 39 and the flange portion 37c in the photographing optical axis OA direction, and the outer frame 37 is also provided with the sub-shaft 45 extending in the photographing optical axis OA direction toward the image surface side from the back end surface (surface on image surface side) of the flange 37c. The main shaft 44 and the sub-shaft 45 are provided outside the photographing optical path from the first lens group 31 to the third lens group 33 (including the shutter/aperture stop unit 34) as seen in the direction orthogonal to the photographing optical axis OA, and are located in opposite sides of the photographing optical path (photographing optical path OA). The movable holding frame 38 which integrally holds the second lens group 32 is supported by the outer frame 37 through the main shaft 44 and the sub-shaft 45.

As illustrated in FIGS. 3A-5, the movable holding frame 38 is provided with a pair of shaft-receiving hole portions 38b and a shaft-receiving groove portion 38c, which project from a frame portion 38a for holding the second lens group 32. A pair of shaft-receiving hole portions 38b is provided in both ends of a connection arm 38d extending in the photographing optical axis OA direction in the position projecting in the radial direction from the frame portion 38a. Both of the shaft-receiving hole portions 38b are provided with a shaft-receiving hole 38e (refer to FIG. 5) through which the main shaft 44 penetrates in the photographing optical axis OA direction, and the central axis line of the shaft-receiving hole 38e is set on the straight line which is consistent with the central axis line of the main shaft 44 in the outer frame 37 (refer to FIG. 4). The shaft-receiving groove portion 38c is provided with a shaft-receiving groove 38f (refer to FIG. 5) which receive the sub-shaft 45 in the photographing optical axis OA direction, the shaft-receiving groove 38f being set corresponding to the positional relationship of the sub-shaft 45 in the outer frame 37 (refer to FIG. 4).

The main shaft 44 penetrates through both of the shaft-receiving hole portions 38b (shaft-receiving hole 38e), and the sub-shaft 45 is received by the shaft-receiving groove portion 38c (shaft-receiving groove 38f), so that the movable holding frame 38 is supported to be movable in the photographing optical axis OA direction in the space on the back end side (image surface side) of the flange portion 37c in the outer frame 37. With this configuration, the movable holding frame 38 can be moved (straight movement) in the photographing optical axis OA (photographing optical path) direction with respect to the outer frame 37, and is prevented from rotating about the photographing optical axis OA with respect to the outer frame 37. The lens driver 50 is provided for moving the movable holding frame 38 (second lens group 32 held by movable holding frame 38) relative to the outer frame 37. For this reason, in Embodiment 1, the outer frame 37 operates as a supporter which supports the movable holding frame 38 (second lens group 32) to be movable in the photographing optical axis OA direction, and the movable holding frame 38 operates as a holder (movable holder) which moves in the photographing optical axis OA direction relative to the outer frame 37 as the supporter, and holds the second lens group 32. The configuration of the lens driver 50 will be described later.

Next, the operation of the above-described imaging unit 13 will be described. As illustrated in FIGS. 3A, 3B, in the imaging unit 13, the driving force of the not-shown driving motor of the lens barrel-driving unit 23 (refer to FIG. 2) is appropriately transferred to a gear through a not-shown gear engaged with a gear portion 42a of the rotation tube 42, so that the rotation tube 42 rotates about the photographing optical axis OA in the fixed frame 41. Then, in the photographing unit 13, the outer frame 37 moves toward the object (subject) side (front side in X-axis direction) in the photographing optical axis OA direction with respect to the fixed frame 41 (rotation tube 42) by the guiding operation of the cam groove 42b of the rotation tube 42 and the cam follower 37b of the outer frame 37. In this case, the outer frame 37 is prevented from rotating about the photographing optical axis OA with respect to the fixed frame 41 (base plate 43) by the guiding operation of the above-described straight guide portion (not shown). The outer frame 37 is thereby extended to the maximum extendable position without rotating about the photographing optical axis OA (refer to FIGS. 3A-3B).

In this case, in the imaging unit 13, as described above, by the forward and backward movement of the outer frame 37 according to the operation of the rotation tube 42, the first lens group 31 supported by the outer frame 37 through the lens holding portion 37a, the second lens group 32 supported by the outer frame 37 through the movable holding frame 38, the shutter/aperture stop unit 34 fixed to the outer frame 37 through the lens holding portion 37a, and the third lens group 33 supported by the outer frame 37 through the lens-holding frame 39 are moved in the photographing optical axis OA direction as predefined. Then, the outer frame 37 is extended to the maximum extendable position, so that the first lens group 31, second lens group 32, shutter/aperture stop unit 34 and the third lens group 33, namely, the photographing optical system 12 become a predetermined photographing standby state (refer to FIGS. 3A-3B).

In the photographing optical system 12, the second lens group (movable holding frame 38) is appropriately moved in the photographing optical axis OA direction by the lens driver 50 in the photographing standby state so as to perform a focusing operation, namely, focus adjustment. In the imaging device 10, upon the focus adjustment during the photographing standby state of the photographing optical system 12 (imaging unit 13), the subject image is formed on the light-receiving surface 22a of the imaging element 22 by the first lens group 31, second lens group 32, shutter/aperture unit 34 and third lens group 33. In the imaging device 10, the imaging element 22 converts (photoelectric conversion) the imaged subject image into electric signals (image data), and outputs the converted signals to the controller 21, and the controller 21 A/D coverts the input electric signals to obtain the converted signals as a digital image (refer to FIG. 2).

In the imaging unit 13, by reversely rotating the driving motor of the lens barrel-driving unit 23 (refer to FIG. 2), the above-described operation can be reversed, and the outer frame 37 can be moved backward to the maximum retracted position with respect to the rotation tube 42 (from FIG. 3A to FIG. 3B). Then, the outer frame 37 is housed inside the rotation tube 42, namely, the casing 11 as illustrated in FIG. 3A (collapsed state), and the photographing optical system 12 (first lens group 31, second lens group 32, shutter/aperture unit 34 and third lens group 33) is housed as predefined. In addition, in Embodiment 1, in response to the shut down operation to the power source button 15 (refer to FIG. 2), the photographing optical system 12 (imaging unit 13) is housed. The portability of the imaging device 10 can be therefore improved in the shut down state (power source OFF).

For this reason, in the imaging unit 13, the outer frame 37, movable holding frame 38, lens-holding frame 39, fixed frame 41 and rotation tube 42 operate as an optical housing member (lens barrel) which houses the first lens group 31, second lens group 32, third lens group 33 and shutter/aperture stop unit 34 as optical members constituting the photographing optical system 12. In the imaging unit 13, the outer frame 37 and the rotation tube 42 operate as a movable lens barrel which moves (rotate) to the fixed frame 41. The outer frame 37, movable holding frame 38, lens-holding frame 39 and rotation tube 42 operate as a lens-driving mechanism for changing the first lens group 31, second lens group 32 and third lens group 33 between the photographing standby state and the housed state, and operate as movable optical housing members which move between the collapsed position and the extended position in the photographing optical axis OA direction relative to the fixed frame 41.

The positions of the first lens group 31, third lens group 33, and shutter/aperture stop unit 34 (including basic position of second lens group 32) are controlled by controlling the rotation posture of the rotation tube 42 by using the counts of the driving pulse generated by a zoom count detector. The zoom count detector includes a pinion gear having an encoder shape directly fixed to an output axis of a not-shown driving motor of the lens barrel-driving unit 23 (refer to FIG. 2) and a photointerrupter, for example, disposed near the pinion gear. The not-shown driving motor is a general DC (direct current) motor. In addition, the driving source for moving the rotation tube 42 detects the driving position by the detector including the encoder and the photointerrupter as the above-described DC motor, but a similar function can be achieved by substituting all of these with a pulse motor. Therefore, the driving motor operates as a lens-driving mechanism driving source which drives a lens driving mechanism together with a spline gear or the like (movable lens barrel-driving force which drives movable lens barrel), and operates as a lens-holding frame driver which drives a movable lens-holding frame through the movable lens barrel.

Figure 7:
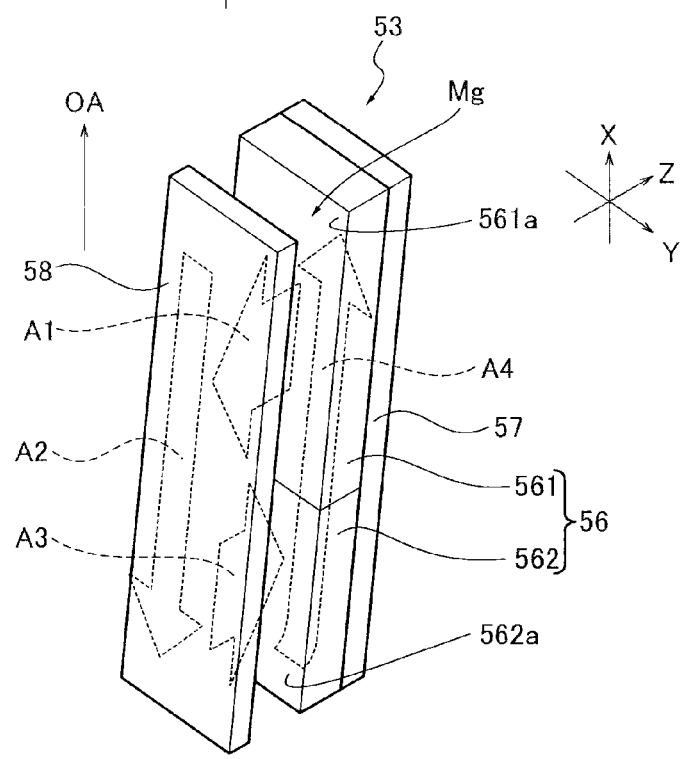
FIG. 7 is a view describing the magnetic circuit 53 including a magnet 56 (first magnet 561 and second magnet 562), back yoke 57 and front yoke 58.
Figure 8:
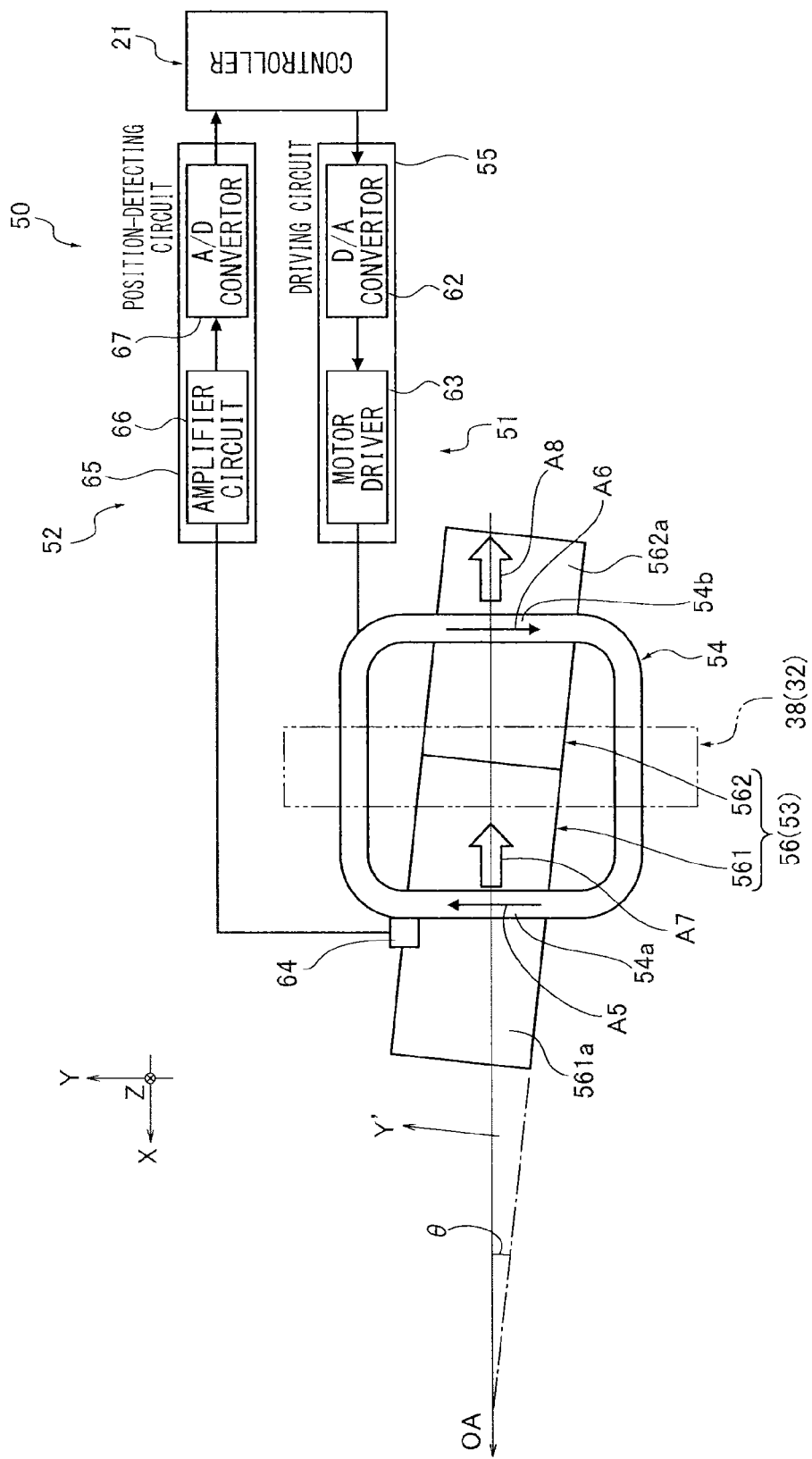
FIG. 8 is a view describing the configuration of the lens driver 50 (lens driving mechanism 51 and position-detecting mechanism 53).
Figure 9:
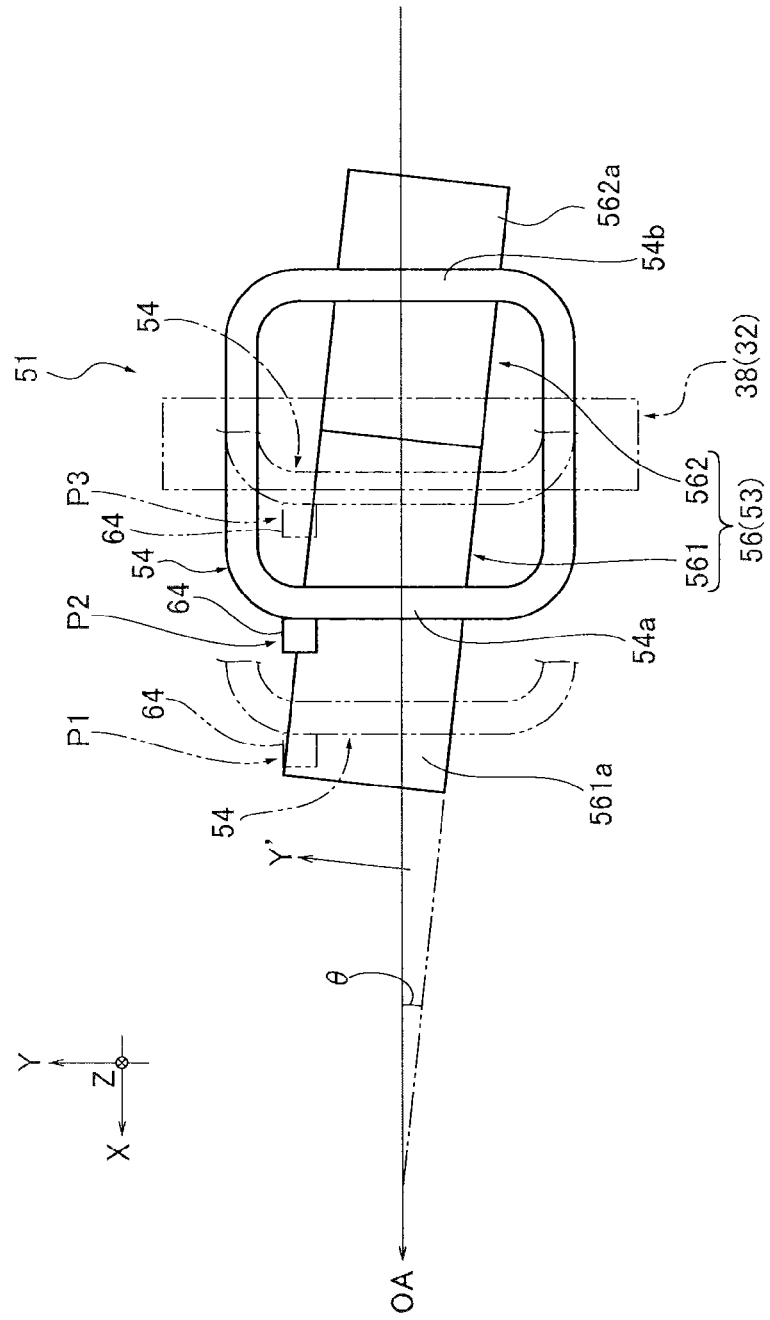
FIG. 9 is a view describing a positional relationship between a magnetic pole surface (inner surface 561a, inner surface 562a) and a magnetism-detecting element 64 (coil 54) when a movable holding frame 38 is moved in the X-axis direction (photographing optical axis OA direction) relative to the outer frame 37.
Figure 10:
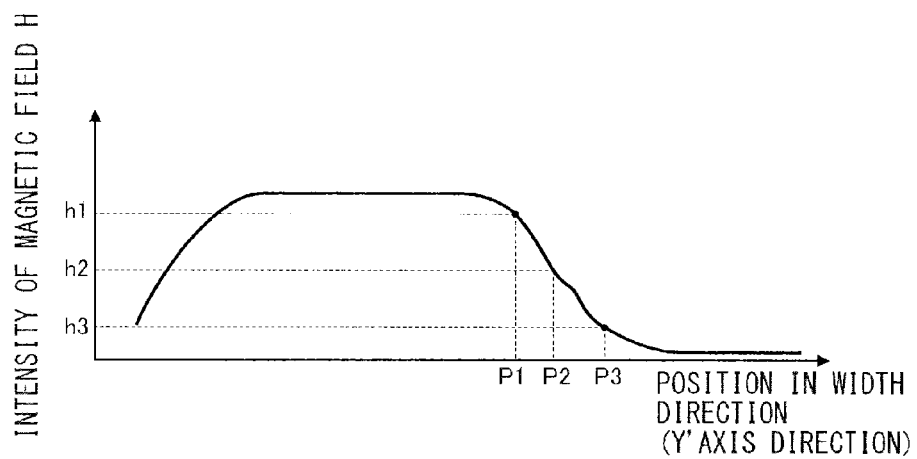
FIG. 10 is a graph illustrating trends in intensity of a magnetic field of the magnet 56 of the magnetic circuit 53 in its width direction (Y' direction), in which the vertical axis illustrates intensity H of a magnetic field formed between the front yoke 58 and the magnetic pole surface (inner surfaces 561a, 562a) in the magnetic circuit 53, and the horizontal axis illustrates the position of the magnet 56 in its width direction (Y' axis direction).
Figure 11:
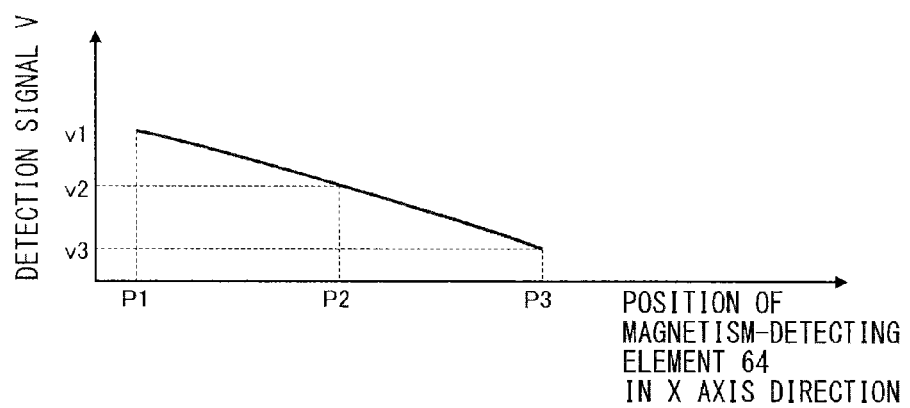
FIG. 11 is a graph illustrating trends in a detection signal V output from the magnetism-detecting element 64 in the magnetic field formed by the magnetic circuit 53 (magnetic pole surface), in which the vertical axis illustrates the detection signal V and the horizontal axis illustrates the position of the magnetism-detecting element 64 in the X-axis direction.

Next, the configuration of the features of the lens driver 50 will be described with reference to FIGS. 6-11. FIG. 6 is a sectional view, which is obtained along I-I line in FIG. 4, describing the configuration of the lens driver 50. FIG. 7 is a view describing a magnetic circuit 53 including a magnet 56 (first magnet 561 and second magnet 562 as one example of magnet which forms magnetic circuit), back yoke 57 and front yoke 58. FIG. 8 is a view describing the configuration of the lens driver 50 (lens-driving mechanism 51 and position-detecting mechanism 53). In FIG. 8, the magnetic circuit 53, the coil 54 of the lens-driving mechanism 51 and the magnetism-detecting element 64 of the position-detecting mechanism 52 are illustrated in sectional obtained along line illustrated in FIG. 6, and a driving circuit 55 of the lens-driving mechanism 51 and a position-detecting circuit 65 of the position-detecting mechanism 52 are illustrated by the block diagram. FIG. 9 is a view describing a positional relationship between a magnetic pole surface (inner surface 561*a*, inner surface 562*a*) and the magnetism-detecting element 64 (coil 54) when the movable holding frame 38 is moved in the X-axis direction (photographing optical axis OA direction) with respect to the outer frame 37. FIG. 10 is a graph illustrating trends in an intensity of a magnetic field of the magnet 56 of the magnetic circuit 53 in its width direction (Y' direction), in which the vertical axis illustrates an intensity H of a magnetic field formed between the front yoke 58 and the magnetic pole surface (inner surfaces 561*a*, 562*a*) in the magnetic circuit 53, and the horizontal axis illustrates the position of the magnet 56 as seen in its width direction (Y' axis direction). FIG. 11 is a graph illustrating trends in a detection signal V output from the magnetism-detecting element 64 in the magnetic field formed by the magnetic circuit 53 (magnetic pole surface), in which the vertical axis illustrates the detection signal V and the horizontal axis illustrates the position of the magnetism-detecting element 64 in the X-axis direction. The points P1, P2, P3 in the horizontal axis of FIGS. 10, 11 show the width direction (Y' axis direction) in the positions of the magnetism-detecting element 64 with respect to the magnet 56 (magnetism circuit 53), which are shown by P1, P2, P3 in FIG. 9. In the following description, based on the imaging device 10 as standard, the photographing optical axis OA direction is set as the X axis direction (subject side is positive side), the tangential line of the rotation direction in the center of the lens driver 50 as seen in the rotation direction based on the photographing optical axis OA as a center is set as the Y axis direction (front side in FIG. 5 is positive side), and the direction orthogonal to the X axis and Y axis (radial direction (orthogonal to photographing optical axis OA and radiation direction from radial direction)) is set as the Z axis direction (outer side is positive side).

The lens driver 50 controls the position of the second lens group 32 in the photographing optical system 12 in the photographing optical axis OA direction. As illustrated in FIGS. 4-8, the lens driver 50 includes the lens-driving mechanism 51 for moving the movable holding frame 38 in the photographing optical axis OA direction relative to the outer frame 37 and the position-detecting mechanism 52 which detects the position of the movable holding frame 38 in the photographing optical axis OA direction.

The lens-driving mechanism 51 includes the magnetic circuit 53 and the driving circuit 55 (refer to FIG. 8). This lens-driving mechanism 51 moves the movable holding frame 38 (coil 54) in the photographing optical axis OA direction relative to the outer frame 37 by generating in the driving circuit 55 a driving current flowing in the coil 54 disposed in the magnetic field formed by the magnetic circuit 54.

The magnetic circuit 53 includes the magnet 56, back yoke 57 (one example of a yoke which forms the magnetic circuit) and front yoke 58 (one example of a yoke which forms the magnetic circuit). The magnet 56 is a plate-like member formed by a material (magnetized material) having a magnetic property, and has a long cuboid shape. In Embodiment 1, this magnet 56 includes a long plate-like first magnet 561 and second magnet 563 each having a thickness direction (Z axis direction) as a magnetized direction, and both of the magnets 561, 562 are arranged in series in the longitudinal direction. The first magnet 561 includes an inner surface 561*a*, which is the inside as seen in the thickness direction (negative side in Z axis direction), as a north pole and an outer surface opposite to the inner surface 561*a* as a south pole. The second magnet 562 also includes an inner surface 562*a*, which is the inside as seen in the thickness direction (negative side in Z axis direction), as a south pole and an outer surface opposite to the inner surface 562*a* as a north pole. Namely, the magnetized direction of the first magnet 561 is opposite to the magnetized direction of the second magnet 562.

The back yoke 57 is provided in the lateral surface of the magnet 56. This back yoke 57 has a plate-like shape having a size which covers the lateral surface of the magnet 56, namely, both of the lateral surface of the first magnet 561 and the lateral surface of the second magnet 562, and is bonded to both lateral surfaces to be fixed while bridging both of the lateral surfaces. The front yoke 58 is provided to have a predetermined interval to the inner surface (561*a*, 562*a*) of the magnet 56 in the Z axis direction. This front yoke 58 has a plate-like shape having a size equal to that of the back yoke 57. The interval between the front yoke 58 and the inner surface of the magnet 56 in the Z axis direction, namely, the distance between the front yoke 58 and the inner surface 561*a* of the first magnet 561 and the front yoke 58 and the inner surface 562*a* of the second magnet 562 are equal. In other words, the magnet 56 (first and second magnets 561, 562), back yoke 57 and front yoke 58 are parallel to each other, and the front yoke 58 is disposed to have a predetermined interval to the bonded magnet 56 and the back yoke 57.

With this configuration, as illustrated in FIG. 7, the magnetic line from the north pole of the inner surface 561*a* of the first magnet 561 enters a part of the front yoke 58 facing the inner surface 561*a* in the Z axis direction (radial direction) (refer to arrow A1), reaches a part of the front yoke 58 facing the inner surface 562*a* of the second magnet 562 in the Z axis direction (refer to arrow A2), enters in the inner surface 562*a* (south pole) from the part of the front yoke 58 facing the inner surface 562*a* of the second magnet 562 in the Z axis direction (refer to arrow A3), and enters in the lateral surface (south pole) of the first magnet 561 through the back yoke 57 from the lateral surface (north pole) of the second magnet 562 (refer to arrow A4). As described above, the magnet 56 (first and second magnets 561, 562), back yoke 57 and front yoke 58 constitute the magnetic circuit 53. With this configuration, a magnetic gap Mg is formed between the inner surface of the magnet 56, i.e., the inner surface 561a of the first magnet 561 and the inner surface 562a of the second magnet 562 and the front yoke 58 in the magnetic circuit 53. The inner surfaces 561a, 562a form magnetic pole surfaces. The magnetic field in the Z axis direction is therefore formed in the magnetic gap Mg in the magnetic circuit 53. The direction of the magnetic field formed between the inner surface 561a and the front yoke 58 is opposite to the direction of the magnetic field formed between the inner surface 562a and the front yoke 58 (refer to arrows A1, A3). The magnetic pole surfaces, i.e., the inner surfaces 561a, 562a have a rectangular shape having a long side in the longitudinal direction because they are configured as described above. The magnetic field formed between the inner surface 561a and the front yoke 58 in the magnetic gap Mg is equal in the longitudinal direction of the magnet 56 as well as the magnetic field formed between the inner surface 562a and the front yoke 58 in the magnetic gap Mg is equal in the longitudinal direction of the magnet 56 in the magnetic circuit 53.

As illustrated in FIGS. 4-6, this magnetic circuit 53 is fixed to the outer frame 37 through a pair of fixing arms 59. Both of the fixing arms 59 project on the negative side in the Z axis direction (inside in the radial direction) from the inner circumferential wall of the outer frame 37. Both end portions of the bonded magnet 56 and back yoke 57 in the longitudinal direction are attached to a pair of fixing arms 59, and both end portions of the front yoke 58 in the longitudinal direction are also attached a pair of fixing arms 59 in a position at a predetermined interval from the magnet 56. The magnetic circuit 53 rotates about the Z axis direction (radial direction) relative to the outer frame 37, in other words, the magnetic pole surfaces (inner surfaces 561a, 562a) rotate relative to the outer frame 37 while being parallel to the X-Y plane, so that the magnetic circuit 53 is fixed to the outer frame 37 such that the longitudinal direction of the magnetic circuit 53 is inclined to the X axis direction (photographing optical axis OA direction) at a predetermined inclination angle θ (refer to FIG. 8). This predetermined inclination angle θ will be described later.

The coil 54 is disposed in the magnetic gap Mg formed by the magnetic circuit 53 in the lens-driving mechanism 51. This coil 54 is formed by a wire rod winding the axis line extending in the Z axis direction (radial direction), and has a rectangular shape as seen in the Z axis direction (refer to FIGS. 5, 8, 9). The coil 54 is attached to the movable holding frame 38 which integrally holds the second lens group 32 through a pair of supporting arms 61. Both supporting arms 61 are provided to project from the frame portion 38a along a surface orthogonal to the photographing optical axis OA in positions different from a pair of shaft-receiving hole portions 38b and shaft-receiving groove portions 38c in the movable holding frame 38. Both supporting arms 61 are provided in the frame portion 38a at a predetermined interval in the rotation direction about the photographing optical axis OA. One side of the coil, which extends in the X axis direction, is attached to each of projection ends of the supporting arms 62. With this configuration, both supporting arms 61 support the coil 54 at a predetermined interval from the frame portion 38a in the Z axis direction, and form a space between the frame portion 38a and the coil 54. This space has a size which can receive the front yoke 58 constituting the magnetic circuit 53 without interfering with each other when the movable holding frame 38 is moved relative to the outer frame 37.

This coil 54 is provided in the movable holding frame 38 (refer to FIGS. 5, 8, 9) such that both sides of the coil 54 attached to a pair of supporting arms 61 are parallel to the photographing optical axis OA direction while the second lens group 32 appropriately constitutes the photographing optical system 12 (refer to FIGS. 3A, 3B). With this configuration, remaining sides (hereinafter, referred to as first side portion 54a and second side portion 54b) of the coil 54 are orthogonal to the X axis direction (photographing optical axis OA direction) and the Z axis direction (radial direction) in the magnetic gap Mg of the magnetic circuit 53, and extend along the Y axis direction (refer to FIGS. 5, 6, 8, 9). Current flows in the first and second side portions 54a, 54b (one example of an electric path) in their extending directions (direction along Y axis direction (refer to arrows A5, A6 in FIG. 8)) because the wire rod is provided to wind the axis line extending in the Z axis direction in the coil 54. Namely, the first and second side portions 54a, 54b are linear electric paths formed by the coil 54 to be orthogonal to the X axis direction (photographing optical axis OA direction) and the Z axis direction (direction of magnetic field formed by the magnetic circuit 53 (magnetic surface)).

As illustrated in FIG. 8, the coil 54 is connected to the driving circuit 55 through the connection line, and the driving circuit 55 is connected to the controller 21 (main circuit board) through a connection line. A driving current generated in the driving circuit 55 flows in the coil 54. The driving circuit 55 generates the driving current under the control of the controller 21, and includes a D/A convertor 62 and a motor driver 63. Upon input of a driving signal as a digital signal from the controller 21, the D/A convertor 62 converts the driving signal as a digital signal into an analogue signal, and outputs the analogue signal to the motor driver 63. The motor driver 63 generates a driving current according to the driving signal in response to the input of the driving signal as an analogue signal from the D/A convertor 62, and supplies the driving current to the coil 54. The driving circuit 55 (motor driver 63) generates a driving current in which its volume and direction flow are appropriately set according to the driving signal from the controller 21. The driving current therefore flows in the first and second side portions 54a, 54b of the coil 54 in their extending direction (Y axis direction) under the control of the controller 21, and the flow direction of the driving current in the first side portion 54a is opposite to the flow direction of the driving current in the second side portion 54b (refer to arrows A5, A6).

The movable holding frame 38 can be moved in the photographing optical axis OA direction by the electromagnetic action of the magnetic field in the magnetic gap Mg and the driving current flowing in the magnetic field by appropriately flowing the driving current in the coil 54 disposed in the magnetic gap Mg formed by the magnetic circuit 53 in the lens-driving mechanism 51. More particularly, in the magnetic circuit 53, in the magnetic gap Mg, the magnetic field toward the negative side in the Z axis direction being formed between the inner surface 561a of the first magnet 561 and the front yoke 58 as well as the magnetic field toward the positive side in the Z axis direction is formed between the inner surface 562a of the second magnet 562 and the front yoke 58 as described above (refer to FIG. 7). In this case, the longitudinal direction of the magnetic circuit 53 is inclined to the X axis direction (photographing optical axis OA direction). However, the inclination is based on the rotation about the Z axis direction (radial direction), so that the direction of the magnetic field formed by the magnetic gap Mg is always the Z axis direction regardless of the inclination.

As illustrated in FIG. 8, under the control of the controller 21, when the driving current toward the arrow A5 flows in the first side portion 54a of the coil 54, the driving current toward the arrow A6 flows in the second side portion 54b. Then, the driving current toward the arrow A5 in the magnetic field toward the negative side in the Z axis direction flows between the inner surface 561a of the first magnet 561 and the front yoke 58, so that the driving force toward the arrow A7 acts on the first side portion 54a in which the driving current flows in accordance with Flemming's left-hand rule. The driving current toward the arrow A6 flows in the magnetic field toward the positive side in the Z axis direction between the inner surface 562a of the second magnet 562 and the front yoke 58, so that the driving force toward the arrow A8 acts on the second side portion 54b in which the driving current flows in accordance with Flemming's left-hand rule. The driving force toward the negative side in the X axis direction with respect to the magnetic circuit 53 acts on the coil 54 because the arrows A7, A8 are directed to the negative side in the X axis direction (image surface side in photographing optical axis OA direction).

Under the control of the controller 21, when the driving current in the direction opposite to the arrow A5 flows in the first side portion 54a, the driving current in the direction opposite to the arrow A6 flows in the second side portion 54b in the coil 45. Then, the driving current in the direction opposite to the arrow A5 flows in the magnetic field toward the negative side in the Z axis direction between the inner surface 561a of the first magnet 561 and the front yoke 58, so that the driving force in the direction opposite to the arrow A7 acts on the first side portion 54a in which the driving current flows. The driving current in the direction opposite to the arrow A6 flows in the magnetic field toward the positive side in the Z axis direction between the inner surface 562a of the second magnet 562 and the front yoke 58, so that the driving force in the direction opposite to the arrow A8 acts on the second side portion 54b in which the driving current flows. The driving force toward the positive side in the X axis direction with respect to the magnetic circuit 53 therefore acts on the coil 54.

As described above, in the lens-driving mechanism 51, by reversing the direction of the driving current flowing in the coil 54, the driving force acting on the coil 54 in the X axis direction, namely, the driving force acting on the coil 54 in the X axis direction can be switched between the driving force toward the negative side and the driving force toward the positive side. As described above, the coil 54 is attached to the movable holding frame 38 through a pair of supporting arms 61, and the magnetic circuit 53 is fixed to the outer frame 37 through a pair of fixing arms 59 (refer to FIGS. 4-6). The movable holding frame 38 can be moved (straight movement) in the photographing optical axis OA direction with respect to the outer frame 37 (refer to FIG. 3). By controlling the lens-driving mechanism 51 under the control of the controller 21, namely, by controlling the direction of the driving current which is supplied to the coil 54 from the lens driving circuit 55 (motor driver 63) in the lens-driving mechanism 50, the movable holding frame 38, namely, the second lens group 32 can freely drive in the photographing optical axis OA direction relative to the outer frame 37.

The lens driver 50 includes the position-detecting mechanism 52 which detects the position of the movable holding frame 38 in the photographing optical axis OA direction. The position-detecting mechanism 52 includes the magnetism-detecting element (magnetic sensor) 64 and the position-detecting circuit 65. The position-detecting mechanism 52 detects the position of the movable holding frame 38 in the photographing optical axis OA direction relative to the outer frame 37 by detecting a gradual change in intensity of a magnetic field formed by the magnetic circuit 53 of the lens-driving mechanism 51 with the magnetism-detecting element 64. With the configuration described above, the intensity of the magnetic field formed by the magnetic circuit 53 of the lens-driving mechanism 51 gradually changes according to the position in the photographing optical axis OA direction. These will be described hereinbelow.

The magnetism-detecting element 64 generates the detection signal V having a magnitude proportional to the intensity of the magnetic field in a portion where the magnetism-detecting element 64 is disposed. The magnetism-detecting element 64 includes, for example, a Hall element or a magnetic resistance element (MR sensor). In Embodiment 1, the magnetism-detecting element 64 includes a Hall element. The magnetism-detecting element 64 is provided in the movable holding frame 38 which supports the second lens group 32, and can be moved in the photographing optical axis OA direction in the magnetic gap Mg together with the movement of the movable holding frame 38 in the photographing optical axis OA direction relative to the outer frame 37. The magnetism-detecting element 64 is fixed to the coil 54 of the lens-driving mechanism 51 in Embodiment 1. The fixing position of the magnetism-detecting element 64 is set as follows.

At first, in the magnetic gap Mg of the magnetic circuit 53 of the lens-driving mechanism 51, the magnetic field toward the negative side in the Z axis direction is formed between the inner surface 561a of the first magnet 561 and the front yoke 58, and the magnetic field toward the positive side in the Z axis direction is formed between the inner surface 562a of the second magnet 562 and the front yoke 58 (refer to FIG. 7) as described above. In this case, the width direction of the magnetic circuit 53 is the Y' axis direction (refer to FIGS. 8, 9). This is because the magnetic circuit 53 (magnet 56) is fixed to the outer frame 37 such that its longitudinal direction is inclined at a predetermined inclination angle θ relative to the X axis direction (photographing optical axis OA direction), so that the width direction of the magnetic circuit 53 (magnet 56) is inclined at an inclination angle θ relative to the X axis direction. In the magnetic gap Mg formed by the magnetic circuit 53, a change in the intensity H of the magnetic field is predefined according to the position in the Y' axis direction. More specifically, as illustrated in FIG. 10, in the magnetic gap Mg, the intensity H of the magnetic field is a predefined intensity in a range from the central portion to the portion near the side end portion (end portion in the width direction) (refer to P1 in FIG. 9) in the magnetic pole surface (inside surfaces 561a, 562a (magnet 56)) in the Y' axis direction (width direction of magnetic circuit 53 (magnet 56)), while the intensity is gradually decreased from the portion near the side end portion to the outside (refer to P2, P3 in FIG. 9), and the intensity becomes extremely weak and its variation becomes extremely small in accordance with an increase in an interval to the magnetic pole surface (side end portion). In Embodiment 1, the magnetic circuit 53 (magnet 56) is configured such that a change in the intensity H of the magnetic field in a range where the intensity is gradually decreased from the portion near the side end portion of the magnetic pole surface to the outside is monotonically decreased in the magnetic gap Mg.

In the lens-driving mechanism 51, the magnetic circuit 53 (magnet 56) is fixed to the outer frame 37 such that its longitudinal direction is inclined at a predetermined inclination angle θ relative to the X axis direction (photographing optical axis OA direction), and the movable holding frame 38 (the coil 54 integrally supported to the movable holding frame 38) is displaced in the X axis direction relative to the outer frame 37 (the magnetic circuit 53 (the magnetic gap Mg)). With this configuration, upon the displacement of the movable holding frame 38 in the X axis direction relative to the outer frame 37, a part of the magnetic pole surface (inner surfaces 561a, 562a (magnet 56)) facing an arbitrary one point (portion provided with the coil 54 for example) in the movable holding frame 38 in Z axis direction (radial direction) monotonically (gradually) changes in the Y' axis direction along a change in the longitudinal direction (refer to P1, P2, P3 in FIG. 9).

In the magnetic circuit 53, as described above, the magnetic field formed between the magnetic pole surface (inner surfaces 561a, 562a) and the front yoke 58 (magnetic gap Mg) is equal in the longitudinal direction of the magnet 56. Moreover, the longitudinal direction of the magnetic circuit 53 is inclined at a predetermined inclination angle θ (refer to FIGS. 8, 9) relative to the X axis direction based on the rotation about the Z axis direction (radial direction), so that the interval to the movable holding frame 38 (coil 54) in the Z axis direction is constant regardless of the position of the magnetic circuit 53 in the longitudinal direction. For this reason, in the magnetic circuit 53 (magnet 56), the intensity H of the magnetic field formed relative to an arbitrary one point in the movable holding frame 38 (coil 54) can be constant regardless of a change in the position of the magnetic pole surface in the longitudinal direction as long as the position of the magnetic pole surface (inner surfaces 561a, 562a (magnet 56)) in the Y' axis direction (width direction) is equal.

The fixing position of the magnetism-detecting element 64 in the movable holding frame 38 is set in a position where the position relative to the magnetic pole surface (inner surfaces 561a, 562a (magnetic circuit 53)) is gradually changed in the Y' axis direction along the displacement of the movable holding frame 38 relative to the outer frame 37 in the X axis direction (photographing optical axis OA direction)). Namely, the fixing position of the magnetism-detecting element 64 is set in a position which changes between the inside and the outside of the magnetic pole surface (inner surfaces 561a, 562a (magnetic circuit 53)) relative to one side end portion along a change in the longitudinal direction in accordance with a change in the movable holding frame 38 relative to the outer frame 37 in the X axis direction (photographing optical axis OA direction) in the Z axis direction (radial direction). Therefore, the magnetism-detecting element 64 is provided to face one side end portion of the magnetic pole surface (inner surfaces 561a, 562a (magnetic circuit 53)) in the Z axis direction (radial direction), namely, in the direction of the magnetic field formed by the magnetic circuit 53 in the magnetic gap Mg while satisfying the above condition. With this configuration, upon the displacement of the movable holding frame 38 relative to the outer frame 37 in the X axis direction, the intensity H of the magnetic field by the magnetic pole surface (inner surfaces 561a, 562b (magnetic circuit 53)) in the position of the magnetism-detecting element 64 gradually changes according to the position in the X axis direction, so that an unambiguous relationship can be set between a change in a magnitude of the detection signal V which is generated by the magnetic detection element 64 and the position of the movable holding frame 38 in the X axis direction.

In Embodiment 1, a predetermined inclination angle θ of the magnetic circuit 53 (longitudinal direction) to the X axis direction is set, and the fixing position of the magnetism-detecting element 64 in the movable holding frame 38 (coil 54) is also set, such that the intensity H of the magnetic field becomes the maximum value (h1 in FIG. 10) in the monotonic change range when the movable holding frame 38 (coil 54) is located on the most subject side (P1 in FIG. 9) within the displaceable range in the X axis direction, and the intensity H of the magnetic field becomes the minimum value (h3 in FIG. 10) in the monotonic change range when the movable holding frame 38 is located on the most image side (P3 in FIG. 9) within the displaceable range in the X axis direction. Therefore, in Embodiment 1, a predetermined inclination angle θ is set such that the magnetic field formed by the magnetic surface (inner surfaces 561a, 562a (magnetic circuit 53)) to the installation position of the magnetism-detecting element 64 in the movable holding frame 38 (coil 54) is changed between the maximum value and the minimum value based on the movement of the movable holding frame 38 in the X axis direction within the movable range to the outer frame 37.

With this configuration, as illustrated in FIG. 11, in the magnetism-detecting element 64, the maximum detection signal v1 is generated when the movable holding frame 38 (coil 54) is located on the most subject side (P1 in FIG. 9), the magnitude of the detection single V generated according to the movement of the movable holding frame 38 (coil 54) on the image side in the X axis direction is monotonically decreased, the detection signal v2 of an intermediate value is generated when the movable holding frame 38 (coil 54) is located in the intermediate position (P2 in FIG. 9) within the movable range, and the minimum detection signal v3 is generated when the movable holding frame 38 (coil 54) is located on the most image side (P3 in FIG. 9). Accordingly, an unambiguous relationship is set between the detection signal V from the magnetism-detecting element 64 and the position of the movable holding frame 38 (coil 54) in the X axis direction.

As illustrated in FIG. 8, the magnetism-detecting element 64 is connected to the position-detecting circuit 65 through a connection line, and the position-detecting circuit 65 is connected to the controller 21 (main circuit board) through a connection line. The position-detecting circuit 65 converts the detection signal V from the magnetism-detecting element 64 into the detection signal to the controller 21, and includes the amplifier circuit 66 and the A/D convertor 57. The amplifier circuit 66 amplifies the detection signal V as an analogue signal generated by the magnetism-detecting element 64, and outputs the amplified signal to the A/D convertor 67. Upon the input of the detection signal as the amplified analogue signal from the amplifier circuit 66, the A/D convertor 67 converts the signal into a digital signal, and outputs the digital signal to the controller 21. The controller 21 thereby obtains information about the intensity H of the magnetic field detected by the magnetism-detecting element 64, and the position of the movable holding frame 38 (coil 54) in the X axis direction can be recognized from that information. Namely, the position-detecting mechanism 52 detects the position of the movable holding frame 38 in the X axis direction (photographing optical axis OA direction) relative to the outer frame 37 with the detection signal V from the magnetism-detecting element 64 as the position detection value in cooperation with the controller 21.

The lens driver 50 detects the position of the movable holding frame 38 in the photographing optical axis OA direction by the position-detecting mechanism 52, and performs servocontrol by using the position detection information (detection signal V) as feedback information when moving the movable holding frame 38 i.e., the second lens group 32 in the photographing optical axis OA direction by the lens-driving mechanism 51 under the control of the controller 21. The lens driver 50 thereby further appropriately controls the position of the movable holding frame 38, i.e., the second lens group 32 in the photographing optical axis OA direction.

Next, a technical problem regarding a position detector which detects a position of a holder (lens held by holder) relative to a supporter by a driver will be described.

A conventional position detector includes a driver as a mechanism which moves a holder relative to a supporter by rotating a lead screw with a stepping motor. Such a position detector is configured to detect a position of a holder (lens) by detecting (counting) the number of driving pulses of the stepping motor. In this case, a photointerrupter is provided in a supporter and a light-shielding plate is provided in a holder, so as to constitute a reference position detector, and the position of the holder, i.e., the lens can be calculated by moving the holder to a reference position based on the detection signal from the reference position detector, and counting the number of driving pulses of the stepping motor which drives the holder to move from the reference position through the lead screw.

Moreover, the position detector can be configured by providing in a supporter a position-detecting magnet which is magnetized such that the magnetic poles alternately differ at predetermined intervals along the moving direction of a holder, and providing in the holder a magnetism-detecting element in a position facing the position-detecting magnet. In this position detector, upon the movement of the holder relative to the supporter, the magnetic poles of the position-detecting magnet facing the magnetism-detecting element alternately change, so that the output from the magnetism-detecting element becomes a repetitive waveform which alternately changes at predetermined intervals. Therefore, the number of repetitive waveforms from the magnetism-detecting element can be used instead of the number of driving pulses of the above-described stepping motor. Such a position detector is used to detect a change in the position of the magnetism-detecting element relative to the position-detecting magnet, namely, a change in the position of the holder relative to the supporter. For this reason, it is not necessary to count the number of driving pulses of the stepping motor, so that an electromagnetic driving actuator such as a voice coil can be used as the driver for the holder, resulting in keeping driving sound down.

However, these position detectors are configured to recognize a change in the holder from a reference position with respect to the supporter by the number of driving pulses or the output from the magnetism-detecting element. For this reason, it is necessary to move the holder to the reference position for every detection of the position of the holder, and thus, it takes a time to detect the position of the holder.

Therefore, it is considered that the position detector is configured by providing in a holder a position-detecting magnet magnetized in the optical axis direction and providing in a supporter a magnetism-detecting element in a position facing the position-detecting magnet in the optical axis direction (refer to Patent Document 1). In this position detector, upon the movement of the holder relative to the supporter in the optical axis direction, the interval between the position-detecting magnet and the magnetism-detecting element is changed according to the position, so that the intensity of the magnetic field formed by the position-detecting magnet in the magnetism-detecting element is changed according to the interval; and thus, an unambiguous relationship can be set between the output voltage value from the magnetism-detecting element and the positional relationship between the supporter and the holder. Therefore, in this position detector, the position of the holder can be detected from the output voltage value of the magnetism-detecting element regardless of the position of the holder relative to the supporter, so that the position of the holder can be immediately detected.

However, with the conventional position detector (lens driver), when a distance from the position-detecting magnet exceeds a predetermined length, the intensity of the magnetic field formed by the position-detecting magnet hardly changes relative to a change in the position. For this reason, the moving range of the holder relative to the supporter is limited. In this conventional position detector (lens driver), it is considered to provide two magnetism-detecting elements to sandwich the position-detecting magnet in the optical axis direction. However, such a configuration is only able to double the moving range compared to the configuration having a single magnetism-detecting element, and also limits the moving range of the holder relative to the supporter. In addition, in the conventional position detector (lens driver), it is necessary to provide a position-detecting magnet specifically for detecting the position of the holder.

Compared to this, in the lens driver 50 (imaging device 10) of Embodiment 1, the position of the movable holding frame 38 in the X axis direction is detected by detecting the intensity FT of the magnetic field formed by the magnetic circuit 53 (magnetic pole surface (inner surfaces 561a, 561b)) as the lens-driving mechanism 51 for moving the movable holding frame 38 (second lens group 32) in the X axis direction (photographing optical axis OA direction) with respect to the outer frame 37 with the magnetism-detecting element 64 (position-detecting mechanism 52) provided in the movable holding frame 38. With this configuration, it becomes unnecessary to provide a position-detecting magnet specifically for detecting the position of the movable holding frame 38, and a further simplified configuration can be obtained.

In the lens driver 50 (imaging device 10), the position of the movable holding frame 38 in the X axis direction is detected by detecting a change in the intensity H of the magnetic field along a change in the position of the magnetic circuit 53 (magnetic surface) in the width direction (Y' direction) with respect to the magnetic circuit 53 (magnet 56) as the lens-driving mechanism 51 provided to basically extend in the X axis direction for moving the movable holding frame 38 (second lens group 32) in the X axis direction relative to the outer frame 37. Accordingly, the magnetic circuit 53 can be used for detecting the position of the movable holding frame 38 without generating a negative effect on the movement of the movable holding frame 38 in the X axis direction.

Moreover, in the lens driver 50 (imaging device 10), the magnetic circuit 53 (magnet 56) as the lens-driving mechanism 51 is provided in the outer frame 37 to be inclined relative to the X axis direction as the movement direction of the movable holding frame 38 (second lens group 32) relative to the outer frame 37, and the magnetism-detecting element 64 (position detection mechanism 52) is provided in the moving holding frame 38, so that an unambiguous relationship is set between the change in the position of the movable holding frame 38 relative to the outer frame 37 in the X axis direction and the change in the position of the magnetic detection element 64 relative to the magnetic circuit 53 (magnetic pole surface) in the width direction. With this configuration, the position of the movable holding frame 38 in the X axis direction can be obtained from the intensity H of the magnetic field by the magnetic circuit 53 detected by the magnetic detection element 64 with a simple configuration.

In the lens driver 50 (imaging device 10), the unambiguous relationship is set between a change in the position of the movable holding frame 38 in the X axis direction and a change in the position of the magnetism-detecting element 64 in the width direction (Y' axis direction) relative to the magnetic circuit 53 (magnetic pole surface) by providing the magnetic circuit 53 (magnet 56) as the lens-driving mechanism 51 in the outer frame 37 to be inclined relative to the X axis direction. Therefore, when the magnetic field formed by the magnetic pole surface (inner surfaces 561a, 562a (magnetic circuit 53)) is changed to the installation position of the magnetism-detecting element 64 in the movable holding frame 38 (coil 54) based on the movement of the movable holding frame 38 relative to the outer frame 37 within the moving range, the position of the movable holding frame 38 in the X axis direction can be detected from the intensity H of the magnetic field detected by the magnetism-detecting element 64 by using the magnetic circuit 53 for the detection of the position of the movable holding frame 38 regardless of the size of the moving range of the movable holding frame 38. For this reason, the moving range of the movable holding frame 38 (holder) relative to the outer frame 37 (supporter) can be prevented from being limited, so that the position of the movable holding frame 38 can be detected over a wide moving range with a simple configuration.

In the lens driver 50 (imaging device 10), by adjusting a predetermined inclination angle θ of the magnetic circuit 53 (magnet 56) as the lens-driving mechanism 51 to the X axis direction, the magnetic field formed by the magnetic pole surface (inner surfaces 561a, 562a (magnetic circuit 53)) can be gradually changed to the installation position of the magnetism-detecting element 64 in the movable holding frame 38 (coil 54) by the movement of the movable holding frame 38 relative to the outer frame 37 within the movable range.

In the lens driver 50 (imaging device 10), the magnetic field formed by the magnetic pole surface (inner surfaces 561a, 562a (magnetic circuit 53)) is set to change between the maximum value and the minimum value relative to the installation position of the magnetism-detecting element 64 in the movable holding frame 38 (coil 54) by the movement of the movable holding frame 38 relative to the outer frame 37 in the movable range, so that the position of the movable holding frame 38 in the X axis direction can be further appropriately detected with a simple configuration.

In the lens driver 50 (imaging device 10), by rotating the magnetic circuit 53 about the Z axis direction (radial direction), its longitudinal direction is inclined at a predetermined inclination angle θ to the X axis direction, so that the interval of the magnetic circuit 53 relative to the movable holding frame 38 (coil 54) in the Z axis direction can be fixed regardless of the position of the magnetic circuit 53 as seen in the longitudinal direction. Therefore, the driving force in the lens-driving mechanism 51 can be constant regardless of a change in the position of the movable holding frame 38 (second lens group 32) relative to the outer frame 37 in the X axis direction.

In the lens driver 50 (imaging device 10), the magnetic field formed between the magnetic surface (inner surfaces 561a, 562a) and the front yoke 58 (magnetic gap Mg) in the magnetic circuit 53 is made uniform in the longitudinal direction of the magnet 56, so that the intensity H of the magnetic field formed to an arbitrary one point in the movable holding frame 38 (coil 54) can be kept constant regardless of a change in the longitudinal direction of the magnetic pole surface (inner surfaces 561a. 562a (magnet 56)) as long as the position in the Y' axis direction (width direction) relative to the magnet 56 is equal. For this reason, an unambiguous relationship can be set between a change in the position of the movable holding frame 38 in the X axis direction relative to the outer frame 37 and a change in the position of the magnetism-detecting element 64 in the width direction relative to the magnetic circuit 53 (magnetic pole surface) by providing the magnetic circuit 53 (magnet 56) as the lens-driving mechanism 51 in the outer frame 37 to be inclined relative to the X axis direction as the movement direction of the movable holding frame 38 (second lens group 32) relative to the outer frame 37, and providing the magnetism-detecting element 64 (position detection mechanism 52) in the movable holding frame 38. Therefore, the position of the movable holding frame 38 can be further appropriately detected from the intensity H of the magnetic field detected by the magnetism-detecting element 64.

In the lens driver 50 (imaging device 10), a change in the intensity H of the magnetic field in the range where the intensity is gradually decreased from the portion near the side end portion of the magnetic pole surface (inner surfaces 561a, 562a) to the outside is monotonically decreased in the magnetic gap Mg formed by the magnetic circuit 53 (magnet 56). With this configuration, the relationship between the position of the movable holding frame 38 (second lens group 32) in the X axis direction relative to the outer frame 37 and the magnitude of the detection signal V from the magnetism-detecting element 64 can be simplified.

In the lens driver 50 (imaging device 10), the magnetic circuit 53 as the lens-driving mechanism 51 is inclined at a predetermined inclination angle θ to the X axis direction, and a change in the intensity H of the magnetic field according to a change in the position of the magnetic circuit 53 (magnetic pole surface) in the width direction (Y' axis direction) is detected by the magnetism-detecting element 64 (position-detecting mechanism 52), so as to obtain the position of the movable holding frame 38 in the X axis direction. Therefore, the interval (clearance) between the magnetic pole surface and the coil 54 can be reduced because a configuration which changes the interval in the Z axis direction between the coil 54 and the magnetic pole surface for use in the detection of the position is not required.

In the lens driver 50 (imaging device 10), the interval (clearance) between the magnetic pole surface (inner surfaces 561a, 562a) formed by the magnetic circuit 53 and the coil 54 can be reduced in the lens-driving mechanism 51, so that the intensity of the magnetic field in the magnetic gap Mg formed by the magnetic circuit 53 can be increased, and thus, a large driving force can be obtained even if power (driving current) which is supplied to the coil 54 is reduced.

In the lens driver 50 (imaging device 10), an unambiguous relationship can be set between a change in the position of the movable holding frame 38 in the X axis direction relative to the outer frame 37 and a change in the position of the magnetism-detecting element 64 relative to the magnetic circuit 53 (magnetic pole surface) in the width direction, so that the position of the movable holding frame 38 in the X axis direction (photographing optical axis OA direction) relative to the outer frame 37 can be detected by the detection signal V as the position detection value from the magnetism-detecting element 64, and thus, the position of the movable holding frame 38 can be immediately detected.

Accordingly, in the lens driver 50 (imaging device 10) in Embodiment 1, the position of the holder (movable holding frame 38) can be detected over a wide moving range.

Embodiment 2

Figure 12:
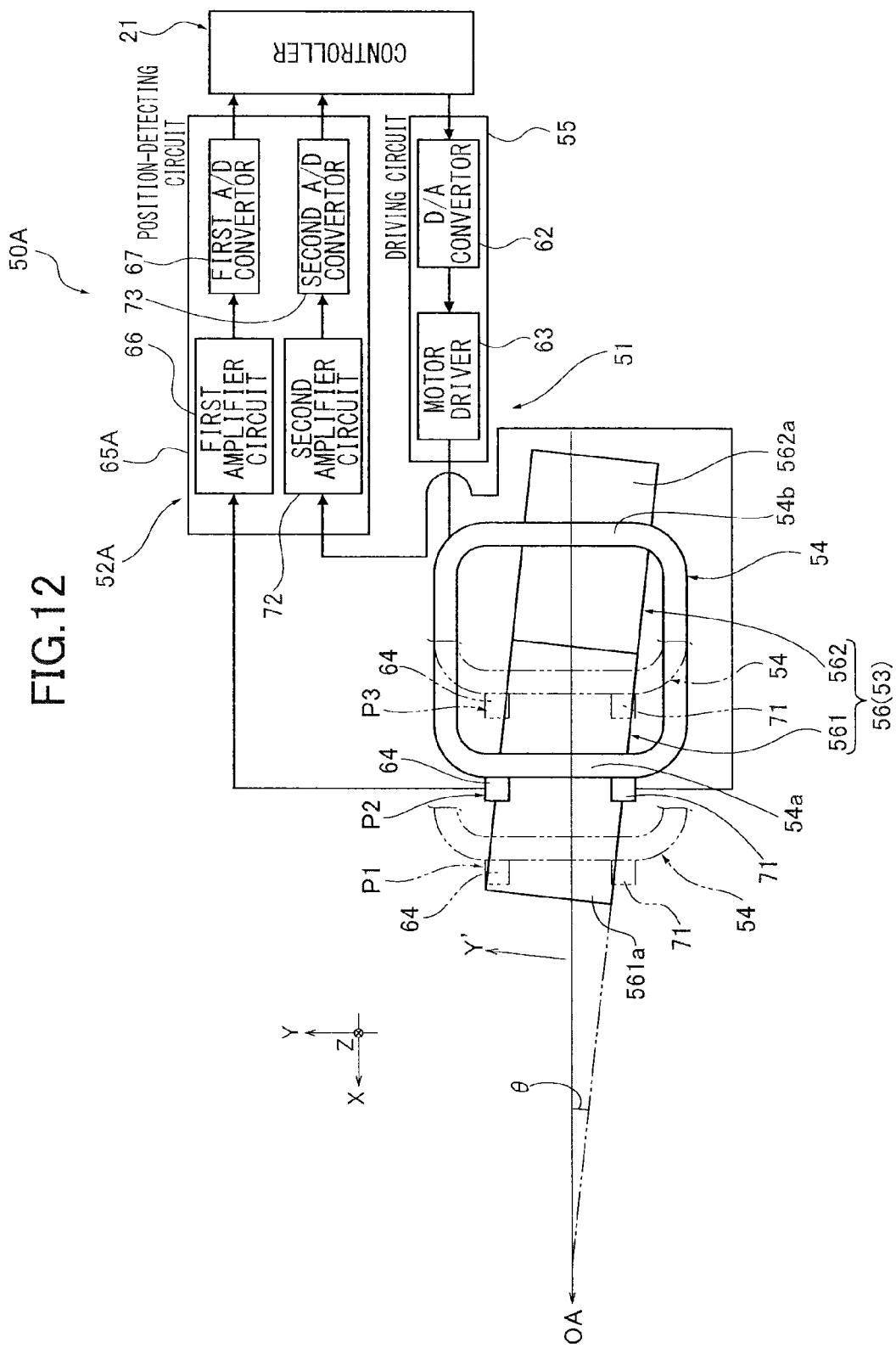
FIG. 12 is a view describing a configuration of a lens driver 50A (lens-driving mechanism 51 and position-detecting mechanism 52A) similar to FIG. 8.
Figure 13:
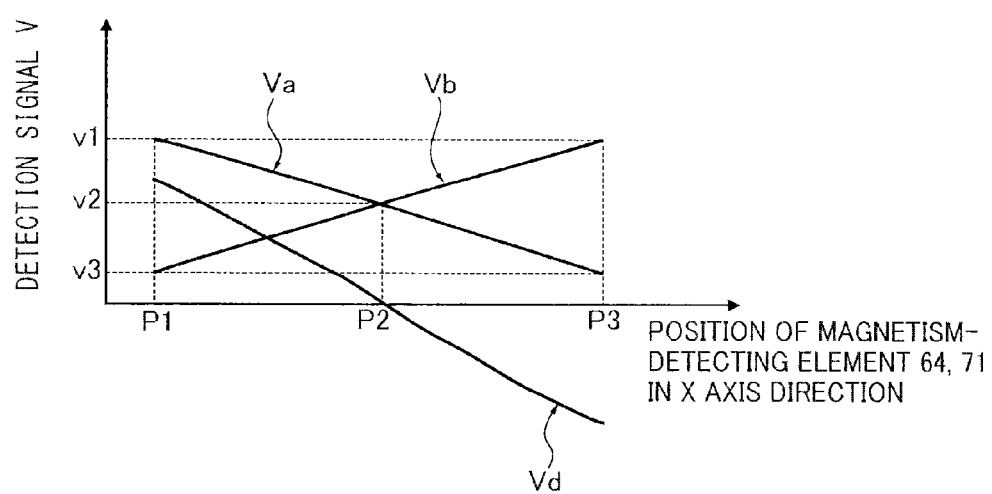
FIG. 13 is a graph illustrating trends in a first detection signal Va output from a first magnetism-detecting element 64, a second detection signal Vb output from a second magnetism-detecting element 71 in the magnetic field formed by the magnetic circuit 53 (magnetic pole surface), and a difference signal Vd between these signals, similar to FIG. 11, in which the vertical axis illustrates a detection signal V (first detection signal Va and second detection signal Vb) and the horizontal axis illustrates the position of the magnetism-detecting element 64 in the X axis direction.

Next, a lens driver 50A according to Embodiment 2 of the present invention will be described. Embodiment 2 is an example having a different configuration of a position-detecting mechanism 52A. Since the basic configuration of the lens driver 50A of Embodiment 2 is similar to that of the lens driver 50 of Embodiment 1, the same reference numbers are applied to the same configurations, and the detailed description thereof will be omitted. FIG. 12 is a view describing the configuration of the lens driver 50A (lens-driving mechanism 51 and position-detecting mechanism 52A) similar to FIG. 8. FIG. 13 is a graph illustrating trends in a first detection signal Va output from a first magnetism-detecting element 64, a second detection signal Vb output from a second magnetism-detecting element 71 in the magnetic field formed by the magnetic circuit 53 (magnetic pole surface), and a difference signal Vd between these signals similar to FIG. 11, in which the vertical axis illustrates a detection signal V (first detection signal Va and second detection signal Vb) and the horizontal axis illustrates the position of the magnetism-detecting element 64 in the X axis direction.

The position-detecting mechanism 52A of the lens driver 50A according to Embodiment 2 includes a magnetism-detecting element (71) in addition to the magnetism-detecting element 64. A position-detecting circuit 65A corresponds to the addition of the new magnetism-detecting element (71). In Embodiment 2, the magnetism-detecting element 64 for use in Embodiment 1 is therefore used as a first magnetism-detecting element 64 and the other magnetism-detecting element is used as a second magnetism-detecting element 71. In Embodiment 2, the detection signal generated by the first magnetism-detecting element 64 is a first detection signal Va. The position detection mechanism 52A is configured to detect the position of the movable holding frame 38 in the photographing optical axis OA relative to the outer frame 37 by detecting a gradual change in the intensity of the magnetic field formed by the magnetic circuit 53 of the lens-driving mechanism 51 with the first magnetism-detecting element 64 and the second magnetism-detecting element 71.

The second magnetism-detecting element 71 includes a function similar to that of the first magnetism-detecting element 64 (magnetism-detecting element 64), and generates a second detection signal Vb having a magnitude proportional to an intensity of the magnetic field in a position where the second magnetism-detecting element 71 is disposed. The second magnetism-detecting element 71 includes a Hall element or a magnetic resistance element, for example, similar to the first magnetism-detecting element 64. The second magnetism-detecting element 71 includes a Hall element in Embodiment 2. The second magnetism-detecting element 71 is provided in the movable holding frame 38 which supports the second lens group 32, and can be moved in the photographing optical axis OA direction inside the magnetic gap Mg together with the movement of the movable holding frame 38 in the photographing optical axis OA direction relative to the outer frame 37. The second magnetism-detecting element 71 is fixed to the coil 54 of the lens-driving mechanism 51 in Embodiment 2. The fixation position of the second magnetism-detecting element 71 is set as follows.

At first, in the magnetic gap Mg of the magnetic circuit 53 of the lens-driving mechanism 51, owing to the setting as described above, similar to one side end portion (edge portion on side that first magnetism-detecting element 64 faces) of the magnetic pole surface facing the first magnetism-detecting element 64 as seen in the Z axis direction (radial direction), a change in the intensity H of the magnetic field in a range where the intensity is gradually decreased from the portion near the side end portion to the outside is monotonically decreased in the other side end portion of the magnetic pole surface.

In this case, upon the displacement of the movable holding frame 38 in the X axis direction relative to the outer frame 37, the position in the magnetic pole surface (inner surfaces 561a, 562a (magnet 56)) facing an arbitrary one point in the movable holding frame 38 (for example, the position where coil 54 is provided) in the Z axis direction (radial direction) is monotonically (gradually) changed in the Y' axis direction along a change in the longitudinal direction. In the magnetic circuit 53 (magnet 56), the intensity H of the magnetic field formed to the arbitrary one point in the movable holding frame 38 (coil 54) can be fixed regardless of a change in the position of the magnetic pole surface in the longitudinal direction as long as the position of the magnetic pole surface (inner surfaces 561a, 562a (magnet 56)) in the Y' axis direction is the same.

The fixing position of the second magnetism-detecting element 71 in the movable holding frame 38 is set in a position where the position relative to the magnetic pole surface (inner surface 561a, 562a (magnetic circuit 53)) is gradually changed in the Y' axis direction according to a displacement of the movable holding frame 30 in the X axis direction (photographing optical axis OA direction) with respect to the outer frame 37, and is set such that the increase and decrease relationship of the gradual change becomes opposite to that of the first magnetism-detecting element 64. Namely, the fixing position of the second magnetism-detecting element 71 is set in a position which changes between the inside and outside to the other side end portion along a change in the magnetic pole surface (inner surfaces 561a, 562a (magnetic circuit)) in the longitudinal direction according to a displacement of the movable holding frame 38 in the X axis direction (photographing optical axis OA direction) relative to the outer frame 37 as seen in the Z axis direction (radial direction). The other side end portion is a side end portion on the side opposite to one side end portion that the first magnetism-detecting element 64 in the magnetic pole surface faces. Therefore, the second magnetism-detecting element 71 satisfies the above condition, and is provided to face the other side end portion of the magnetic pole surface (inner surfaces 561a, 562b (magnetic circuit 53)) as seen in the Z axis direction, namely, the direction of the magnetic field formed by the magnetic circuit 53 in the magnetic gap Mg. With this configuration, upon the displacement of the movable holding frame 38 in the X axis direction relative to the outer frame 37, the intensity H of the magnetic field by the magnetic pole surface (inner surfaces 561a, 562a (magnetic circuit 53)) in a position where the second magnetism-detecting element 71 is located is gradually changed according to the position in the X axis direction, so that an unambiguous relationship can be set between the position of the movable holding frame 38 in the X axis direction and a change in the magnitude of the generated second detection signal Vb (refer to FIG. 13). A change in the magnitude of the second detection signal Vb becomes an inclination opposite to that of the first detection signal Vg generated by the first magnetism-detecting element 64 (refer to FIG. 13).

In Embodiment 2, the fixing position of the second magnetism-detecting element 71 in the movable holding frame 38 (coil 54) is set such that the intensity H of the magnetic field becomes the minimum value in the range where the intensity H of the magnetic field is monotonically changed when the movable holding frame 38 (coil 54) is located on the most subject side (P3 in FIG. 12) in the displaceable range in the X axis direction, and the intensity H of the magnetic field becomes the maximum value in the range where the intensity H of the magnetic field is monotonically changed when the movable holding frame 38 (coil 54) is located on the most image side (P1 in FIG. 12) in the displaceable range in the X axis direction. With this configuration, as illustrated in FIG. 13, in the second magnetism-detecting element 71, the minimum detection signal v3 is generated when the movable holding frame 38 (coil 54) is located on the most subject side (P1 in FIG. 12), the second detection signal Vb is monotonically increased based on the movement of the movable holding frame 38 (coil 54) on the image side in the X axis direction, the detection signal v2 of an intermediate value is generated when the movable holding frame 38 (coil 54) is located in the intermediate position (P2 in FIG. 12) within a movable range, and the maximum detection signal v1 is generated when the movable holding frame 38 (coil 54) is located on the most image side (P3 in FIG. 12). Therefore, an unambiguous relationship is set between the second detection signal Vb from the second magnetism-detecting element 71 and the position of the movable holding frame 38 (coil 54) in the X axis direction, and a change in the magnitude of the second detection signal Vb is opposite to that of the first detection signal Va from the first magnetism-detecting element 64.

As illustrated in FIG. 12, the second magnetism-detecting element 71 is connected to the position-detecting circuit 65A through a connection line, and the position-detecting circuit 65A is connected to the controller 21 (main circuit board) through a connection line. The position-detecting circuit 65A converts the first detection signal Va from the first magnetism-detecting element 64 to the detection signal for the controller 21, and converts the second detection signal Vb from the second magnetism-detecting element 71 to the detection signal for the controller 21. Therefore, the position-detecting circuit 65A includes an amplifier circuit (72) and an A/D convertor (73) in addition to the amplifier circuit 66 and the A/D convertor 67. In Embodiment 2, the amplifier circuit 66 used in Embodiment 1 is used as the first amplifier circuit 66 as well as the A/D convertor 67 used in Embodiment 1 being used as the first A/D convertor 67, and the other amplifier circuit is used as the second amplifier circuit 72 as well as the other A/D convertor being used as the second A/D convertor 73. The second amplifier circuit 72 amplifies the second detection signal Vg as an analogue signal generated by the second magnetism-detecting element 71 to output the amplified signal to the second A/D convertor 73. The second A/D convertor 73 converts the amplified detection signal as an analogue signal in response to the input of the detection signal from the second amplifier circuit 72 to output the converted signal to the controller 21.

With this configuration, the controller 21 can obtain the information of the intensity H of the magnetic field detected by the second magnetism-detecting element 71. In the controller 21 of Embodiment 2, the intensity H of the magnetic field detected by the first magnetism-detecting element 64 is also obtained from the position-detecting mechanism 52A of the lens-driving mechanism 50A. For this reason, in Embodiment 2, the controller 21 uses the first detection signal Va from the first magnetism-detecting element 64 and the second detection signal Vb from the second magnetism-detecting element 71, and obtains the position detection value Vp by normalizing the difference signal Vd (=Va−Vb) of these signals with the sum signal Vs (=Va+Vb). Namely, the position detection value Vp can be obtained by the following equation (1). In addition, the sum signal Vs becomes a constant value because the first magnetism-detecting element 64 and the second magnetism-detecting element 71 are provided as described above.

$$Vp=Vd/Vs=(Va-Vb)/(Va+Vb) \quad (1)$$

In Embodiment 2, the controller 21 recognizes the position of the movable holding frame 38 (coil 54) in the X axis direction from the position detection value Vp based on the first detection signal Va and the second detection signal Vb. In other word, the position-detecting mechanism 52A detects the position of the movable holding frame 38 in the X axis direction (photographing optical axis OA direction) relative to the outer frame 37 by the position detection value Vp obtained from the first detection value Va and the second detection value Vb in cooperation with the controller 21.

The lens driver 50A of Embodiment 2 is configured to detect the position of the movable holding frame 38 in the photographing optical axis OA direction by the position-detecting mechanism 52A, and perform servo control by using the position detection information (position detection value Vp) as feedback information when moving the movable holding frame 38, i.e., the second lens group 32 in the photographing optical axis OA direction by the lens-driving mechanism 51 under the control of the controller 21. The lens driver 50A can thereby appropriately control the position of the movable holding frame 38, i.e., the second lens group 32 in the photographing optical axis OA direction.

Since the configuration of the lens driver 50A (imaging device 10) of Embodiment 2 is basically similar to the configuration of the lens driver 50 (imaging device 10) of Embodiment 1, the effects similar to those in Embodiment 1 can be basically obtained in Embodiment 2.

Moreover, in the lens driver 50A (imaging device 10) of Embodiment 2, the position of the movable holding frame 38 in the X axis direction (photographing optical axis OA direction) is recognized based on the position detection value Vp in which the difference signal Vd of the first detection signal Va from the first magnetism-detecting element 64 and the second detection signal Vb from the second magnetism-detecting element 71 is normalized by the sum signal Vs, so that in-phase noise such as a negative effect of the magnetic field due to current (driving current) flowing to the coil 54 can be cancelled, and thus, the position can be further appropriately recognized.

Furthermore, in the lens driver 50A (imaging device 10), the position of the movable holding frame 38 (coil 54) in the X axis direction can be recognized from the position detection value Vp in which the difference signal Vd of the first detection value Va and the second detection value Vb is normalized by the sum signal Vs, so that the position detection signal Vp can be prevented from fluctuating even if the magnet 56 (first and second magnets 561, 562) is demagnetized due to a temporal change, temperature change of an atmosphere (position where lens driver 50A is provided), or the like. Thus, the position can be further appropriately recognized.

Therefore, in the lens driver 50A (imaging device 10) in Embodiment 2, the position of the holder (movable holding frame 38) can be detected over a wide moving range.

In the above embodiments, the lens drivers 50, 50A are described. However, the lens drivers are not limited to the above embodiments as long as they are a lens driver which moves at least one lens in an optical axis direction relative to a supporter including a holder provided in the supporter to hold the lens to be movable in the optical axis direction, a driver configured to apply to the holder a driving force in the optical axis direction relative to the supporter, and a position detector configured to detect a position of the holder in the optical axis direction relative to the supporter, the lens driver including a coil provided in one of the holder and the supporter to form a straight electric path orthogonal to the optical axis direction; and a magnetic circuit provided in the other of the holder and the supporter, the magnetic circuit including a rectangular magnetic pole surface having a predetermined width to form a magnetic field orthogonal to the optical axis direction and the electric path, and being provided such that the magnetic pole surface faces the optical path, wherein the magnetic circuit is provided such that the magnetic pole surface is parallel to a plane including the optical axis direction and the straight line direction of the electric path, and a pair of side end portions of the magnetic pole surface as seen in its width direction is inclined to the optical axis direction, the position detector includes a magnetism-detecting element provided in the one of the holder and the supporter, and the magnetism-detecting element is provided to face one of the side end portions of the magnetic pole surface as seen in the direction of the magnetic field formed by the magnetic circuit.

In the above embodiments, the lens driver 50 is provided to move the movable holding frame 38, which holds the second lens group 32 as a focusing lens, as a holder with respect to the outer frame 37, which supports the movable holding frame 38 to be movable in the photographing optical axis OA direction, as a supporter. However, the lens driver is not limited to the above embodiments, and it can be a lens driver which is applied to a so-called zoom mechanism (electric zoom function) which moves a lens for changing a focal length, for example, as long as it is a lens driver provided to move a holder which holds a lens relative to a supporter, so as to move a lens in the photographing optical axis OA direction relative to a supporter.

In the above embodiments, the magnetic circuit 53 (magnet 56) of the lens driver 51 is provided in the outer frame 37 (supporter), and the coil 54 of the lens-driving mechanism 51 is provided in the movable holding frame 38 (holder). However, these are not limited to the above embodiments, and the magnetic circuit 53 can be provided in the movable holding frame 38 (holder) and the coil 54 can be provided in the outer frame 37 (supporter) as long as the magnetism-detecting element 64 of the position-detecting mechanism 52 is movably provided to be integrated with the coil 54, and the magnetic circuit 53 (a pair of side end portions) is inclined to the photographing optical axis OA direction.

In the above embodiments, the outer frame 37 as a supporter is movable in the photographing optical axis OA direction relative to the fixed frame 41, i.e., the casing 11 through the rotation tube 42. However, such a configuration is not limited to the above embodiments, and the outer frame 37 can be fixed to the casing 11 (fixed frame 41), for example, as long as a supporter can move a holder which holds a lens for moving the lens in the photographing optical axis OA direction relative to the supporter.

In the above embodiments, the coil 54 of the lens-driving mechanism 51 has a circular shape, and the first side portion 54a and the second side portion 54b, which can flow current in the direction of the magnetic field formed by the magnetic circuit 53 (magnetic gap Mg) and the direction orthogonal to the photographing optical axis OA direction which are opposite to each other, are formed. However, these are not limited to the above embodiments as long as they can form a straight electric path which can flow current in the direction of the magnetic field formed by the magnetic circuit 53 (magnetic gap Mg) and the direction orthogonal to the photographing optical axis OA direction.

In the above embodiments, the magnet 56 of the magnetic circuit 53 of the lens-driving mechanism 51 includes the first magnet 561 and the second magnet 562 in which their magnetized directions are opposite to each other, and the inner surface 561a and the inner surface 562a as two magnetic pole surfaces, which form the magnetic fields having different directions to each other relative to the first side portion 54a and the second side portion 54b of the coil 54, are provided. However, the magnet is not limited to the above embodiments as long as a magnet forms magnetic fields having the direction orthogonal to the photographing optical OA direction and the direction of the electric path (current) formed by the coil 54.

In the above embodiments, the magnetic pole surface (inner surfaces 561a, 562a) of the magnetic circuit 53 of the lens-driving mechanism 51 has a rectangular shape having a long side in the extending direction orthogonal to the width direction (Y' axis direction). However, it is not limited to the above embodiments as long as a ratio of the width and the length in the extending direction is set in view of a necessary intensity of the magnetic field, a movable range of the holder (movable supporting frame 38) relative to the supporter (outer frame 37), or the like.

In the above embodiments, by the displacement of the movable holding frame 38 in the X axis direction relative to the outer frame 37, the magnetic field formed by the magnetic pole surface (inner surfaces 561a, 562a (magnetic circuit 53)) relative to the installation position of the magnetism-detecting element 64 (second magnetism-detecting element 71) in the movable holding frame 38 (coil 54) is set to change between the maximum value and the minimum value. However, it is not limited to the above embodiments as long as a magnetic field is set such that its intensity H is gradually changed to obtain an unambiguous relationship of the position of the movable holding frame 38 in the X axis direction and a change in the magnitude of the detection signal V (Va, Vb).

In the above embodiments, the imaging device 10 is described as one example of an electric device. However, an electric device is not limited to the above embodiments as long as it has a holder, which holds a lens, supported to be movable in the optical axis direction relative to a supporter, and moves in the optical axis direction relative to the supporter by a driving force from a driver, even if it is an electric device such as an image input device or an electric device such as a handheld terminal such as a PDA (personal data assistant) or a cell phone. This is because an electric device having a camera function has recently been developed, and such an electric device has functions and configuration, which are substantially the same as those of the imaging device 10, although their outer appearances are slightly different to each other.

Although the embodiments of the present invention have been described above, the present invention is not limited thereto. It should be appreciated that variations may be made in the embodiment described by persons skilled in the art without departing from the scope of the present invention.

According to the embodiments of the present invention, the position of the holder can be detected over a wide moving range in a lens driver.

What is claimed is:

1. A lens driver which moves at least one lens in an optical axis direction relative to a supporter, comprising:
   a holder provided in the supporter relative to hold the lens to be movable in the optical axis direction;
   a driver configured to apply to the holder a driving force in the optical axis direction relative to the supporter; and
   a position detector configured to detect a position of the holder in the optical axis direction relative to the supporter,
   the lens driver including:
      a coil provided in one of the holder and the supporter to form a straight electric path orthogonal to the optical axis direction; and
      a magnetic circuit provided in the other of the holder and the supporter, the magnetic circuit including a rectangular magnetic pole surface having a predetermined width to form a magnetic field orthogonal to the optical axis direction and the electric path, and being provided such that the magnetic pole surface faces the optical path, wherein
   the magnetic circuit is provided such that the magnetic pole surface is parallel to a plane including the optical axis direction and the straight line direction of the electric path, and a pair of side end portions of the magnetic pole surface as seen in its width direction is inclined to the optical axis direction, the position detector includes a magnetism-detecting element provided in the one of the holder and the supporter, and the magnetism-detecting element is provided to face one of the side end portions of the magnetic pole surface as seen in the direction of the magnetic field formed by the magnetic circuit.

2. The lens driver according to claim 1, wherein the coil has a circular shape which forms the electric path in which a direction of current is opposite to each other in two positions as seen in the optical axis direction, the magnetic circuit has a circular shape which forms a magnetic gap by the two magnetic pole surfaces facing the respective electric paths, such that directions of electric fields to the respective electric paths are opposite to each other, and the coil of the driver is disposed in the magnetic gap in the magnetic circuit.

3. The lens driver according to claim 1, wherein the magnetic circuit includes a magnet and a yoke.

4. The lens driver according to claim 1, wherein an inclination of the magnetic circuit to the optical axis direction is set to gradually change an intensity of a magnetic field by the magnetic pole surface relative to the magnetism-detecting element based on a change in a relative position of the magnetism-detecting element and the magnetic circuit according to a change in a relative position of the supporter and the holder in the optical axis direction.

5. The lens driver according to claim 1, wherein the magnetic pole surface has a rectangular shape having a long side in an extending direction of both side end portions.

6. The lens driver according to claim 5, wherein the magnetism-detecting element is provided in a position where the magnetic field by the magnetic pole surface becomes the strongest when the magnetic circuit and the coil are located in one end position in a relative movable range in the optical axis direction and the magnetic field by the magnetic pole surface becomes the weakest when the magnetic circuit and the coil are located on another end position in the movable range.

7. The lens driver according to claim 1, wherein the magnetism-detecting element is used as a first magnetism-detecting element, the position detector includes a second magnetism-detecting element provided in the one of the holder and the supporter, and the second magnetism-detecting element is provided to face the other side end portion of the magnetic pole surface as seen in the direction of the magnetic field formed by the magnetic circuit.

8. The lens driver according to claim 7, wherein the position detector uses a value in which a difference between a first output value from the first magnetism-detecting element and a second output value from the second magnetism-detecting element is normalized by a sum of the first output value and the second output value as a position detection value.

9. An imaging unit including the lens driver according to claim 1.

10. An imaging device including the imaging unit according to claim 9.

* * * * *